United States Patent
Anderson et al.

(10) Patent No.: US 12,364,194 B2
(45) Date of Patent: Jul. 22, 2025

(54) SYSTEM AND METHOD FOR CONTROLLING SOIL COMPACTION

(71) Applicant: DEERE & COMPANY, Moline, IL (US)

(72) Inventors: Noel W. Anderson, Fargo, ND (US); Mahesh Somarowthu, Pune (IN)

(73) Assignee: Deere & Company, Moline, IL (US)

( * ) Notice: Subject to any disclaimer, the term of this patent is extended or adjusted under 35 U.S.C. 154(b) by 290 days.

(21) Appl. No.: 17/879,193

(22) Filed: Aug. 2, 2022

(65) Prior Publication Data

US 2024/0040965 A1    Feb. 8, 2024

(51) Int. Cl.
   *A01D 41/127*    (2006.01)
   *A01F 15/08*    (2006.01)
   *G05D 1/00*    (2006.01)

(52) U.S. Cl.
   CPC ...... *A01D 41/1278* (2013.01); *A01F 15/0825* (2013.01); *G05D 1/0274* (2013.01)

(58) Field of Classification Search
   None
   See application file for complete search history.

(56) References Cited

U.S. PATENT DOCUMENTS

| | | | |
|---|---|---|---|
| 6,390,204 | B1 | 5/2002 | Schafle |
| 8,234,033 | B2 | 7/2012 | Brubaker et al. |
| 9,511,633 | B2 | 12/2016 | Anderson et al. |
| 10,582,659 | B2 | 3/2020 | Fay, II |
| 2006/0123764 | A1 | 6/2006 | Mclean et al. |
| 2016/0157414 | A1* | 6/2016 | Ackerman ............... G01S 5/16 701/25 |
| 2018/0325032 | A1* | 11/2018 | Rotole ............... G05D 1/0278 |
| 2019/0343035 | A1* | 11/2019 | Smith ............... A01B 69/004 |
| 2021/0195825 | A1 | 7/2021 | Zhou |
| 2021/0195827 | A1 | 7/2021 | Zhou |
| 2022/0210975 | A1* | 7/2022 | Digman ............... A01F 15/00 |

(Continued)

OTHER PUBLICATIONS

"Effects of Soil Compaction", PennState Extension, Mar. 8, 2005, https://extension.psu.edu/effects-of-soil-compaction (17 pp).

(Continued)

*Primary Examiner* — Hongye Liang
(74) *Attorney, Agent, or Firm* — Taft Stettinius & Hollister LLP; Stephen F. Rost

(57) ABSTRACT

Methods and system for minimizing soil compaction relating to operations performed by agricultural machines. The agricultural machines can be guided so that at least one engagement body travels along an existing track path that was established by a prior travel of the same or different agricultural machine. Further, travel plans can determine the sequence in which the agricultural machine(s) travel in areas in the field so that travel on the track path(s) can be initiated in drier regions in the field. Operation of agricultural machines can also be adjusted to minimize deviations of other agricultural machines from existing track paths. For example, a windrower can operate a diverter to deposit a windrow at an offset location, and with a non-linear pattern, that may limit a baler from deviating from an existing track path while collecting crop material from the windrow, while also assisting in forming uniformly shaped crop bales.

19 Claims, 12 Drawing Sheets

(56) References Cited

U.S. PATENT DOCUMENTS

2023/0049727 A1\*  2/2023  Hamilton ............. A01D 43/085
2023/0273614 A1\*  8/2023  Fjelstad ............... G05D 1/0212
                                                                701/50

OTHER PUBLICATIONS

Odey, Simon Ogbeche, "Overview of Engineering Problems of Soil Compaction and Their Effects on Growth and Yields of Crops", European Journal of Advances in Engineering and Technology, 2018, 5(9): 701-709, ISSB: 2394-658X (10 pp).

\* cited by examiner

SYSTEM AND METHOD FOR CONTROLLING SOIL COMPACTION

FIELD OF THE DISCLOSURE

The present disclosure generally relates to systems and methods for controlling soil compaction in agricultural fields and, more specifically, to systems and methods for operating and guiding the travel of agricultural machines in manners that control soil compaction.

BACKGROUND

With respect to at least certain types of agricultural crops, including, but not limited to, alfalfa and sod grass, soil compaction and stand damage can relatively significantly adversely impact crop yields. Further, the adverse effects of soil compaction to crop yields, including compaction of topsoil, an upper part of the subsoil, and a lower portion of the subsoil can last for years. A primary cause of crop compaction can be attributed to the travel of agricultural machines in the fields containing the crops. For example, soil compaction can be attributed to wheels or tracks of agricultural machines compacting the soil as the agricultural machines are performing agricultural operations, including planting seed, spraying crops, cutting crops, baling crops, and/or foraging operations, among other operations. Yet, while soil compaction by such agricultural machines remains a concern, the average weight of modern agricultural machines has steadily increased at least over the last fifty years.

Additionally, the impact of stand damage that is associated with cut crops laying on top of crop stands can relatively significantly increase within a few days of the crop being cut, and moreover, as the number of days that the crop lays on the stand increases. For example, damage to alfalfa stands five days after cutting can be relatively significantly higher than stand damage that may occur two days after cutting.

Accordingly, systems and methods to minimize soil compaction associated with the operation of agricultural machines remain an area of interest.

SUMMARY

The present disclosure may comprise one or more of the following features and combinations thereof.

In one embodiment of the present disclosure, a method is provided that can include a method comprising receiving information indicating, for a first plurality of engagement bodies of a first agricultural machine, a first plurality of track paths, each track path of the first plurality of track paths corresponding to a location at which at least one of the first plurality of engagement bodies engaged a ground surface of a field. The method can also include identifying a location of a first windrow formed by operation of the first agricultural machine, and generating a signal for guidance of a second agricultural machine that can be based at least in part on (1) the identified location of the windrow, and (2) maintaining one or more of a second plurality of engagement bodies of the second agricultural machine on at least a portion of one or more of the first plurality of track paths as the second agricultural machine travels along the field and performs an agricultural operation using the first windrow.

In another embodiment, a method is provided that can include receiving information regarding a configuration of a second agricultural machine that will perform an agricultural operation using a windrow deposited on a field by a first agricultural machine, the received information indicating at least a position of an engagement body of the second agricultural machine. The method can also include determining a location for the first agricultural machine to deposit the windrow on the field, the determined location being based at least in part on a location at which the engagement body of the second agricultural machine will travel along at least a portion of the track path.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
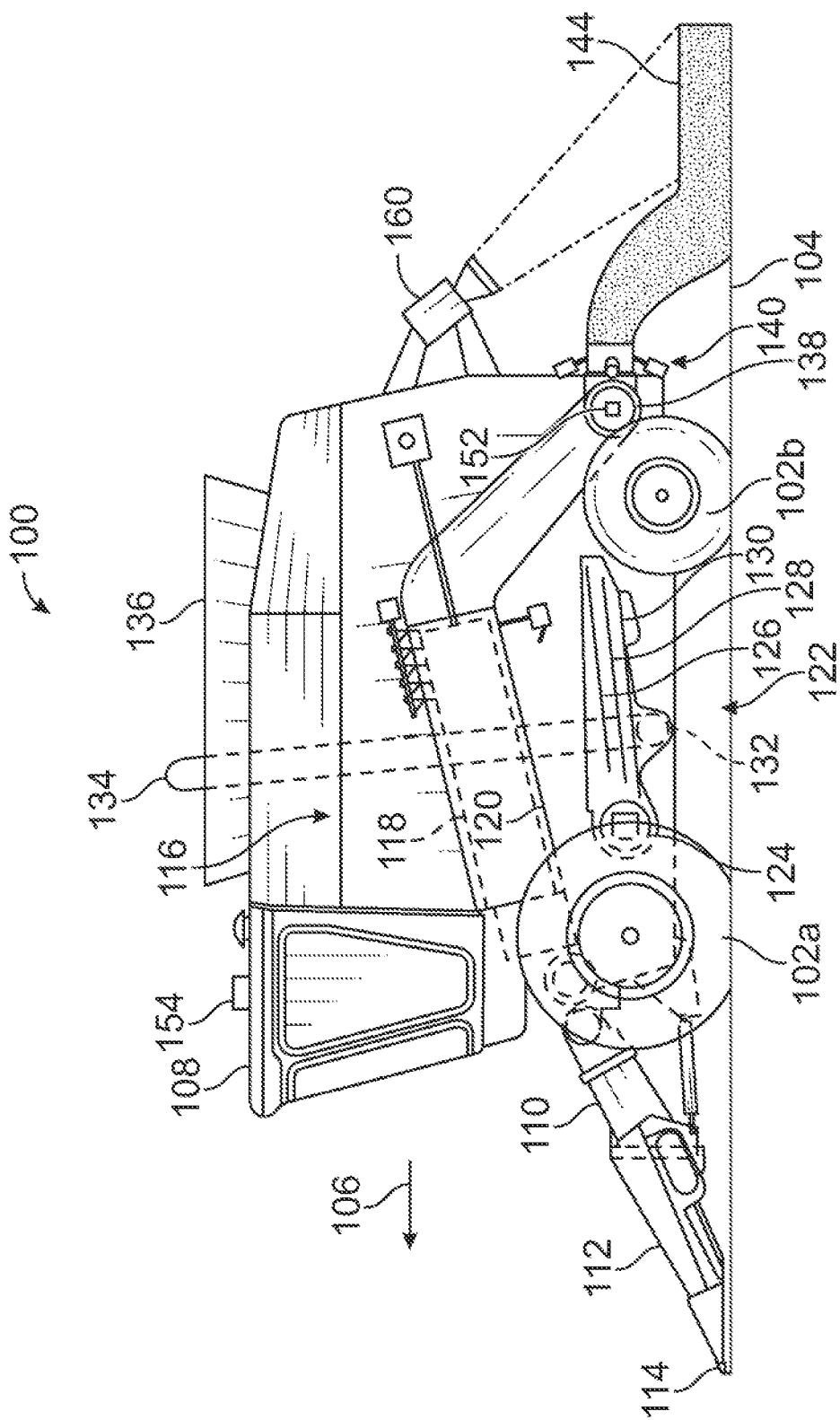
FIG. 1 is a side view of an exemplary first agricultural machine in the form of a combine harvester having windrowing capabilities.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

FIG. 1 illustrates an exemplary first agricultural machine 100. While FIG. 1 illustrates the agricultural machine 100 in the form of a combine having windrower capabilities, the subject disclosure is applicable to a variety of different types of agricultural machines, including, but not limited to, windrowers, planters, harvesters, sprayers, combine harvesters, and tractors, among other agricultural machines. Additionally, the agricultural machine 100 can either be self-propelled, or can be adapted to tow, pull, or otherwise drive movement of an agricultural implement that can be attached, or otherwise coupled to, the agricultural machine 100.

Figure 9A:
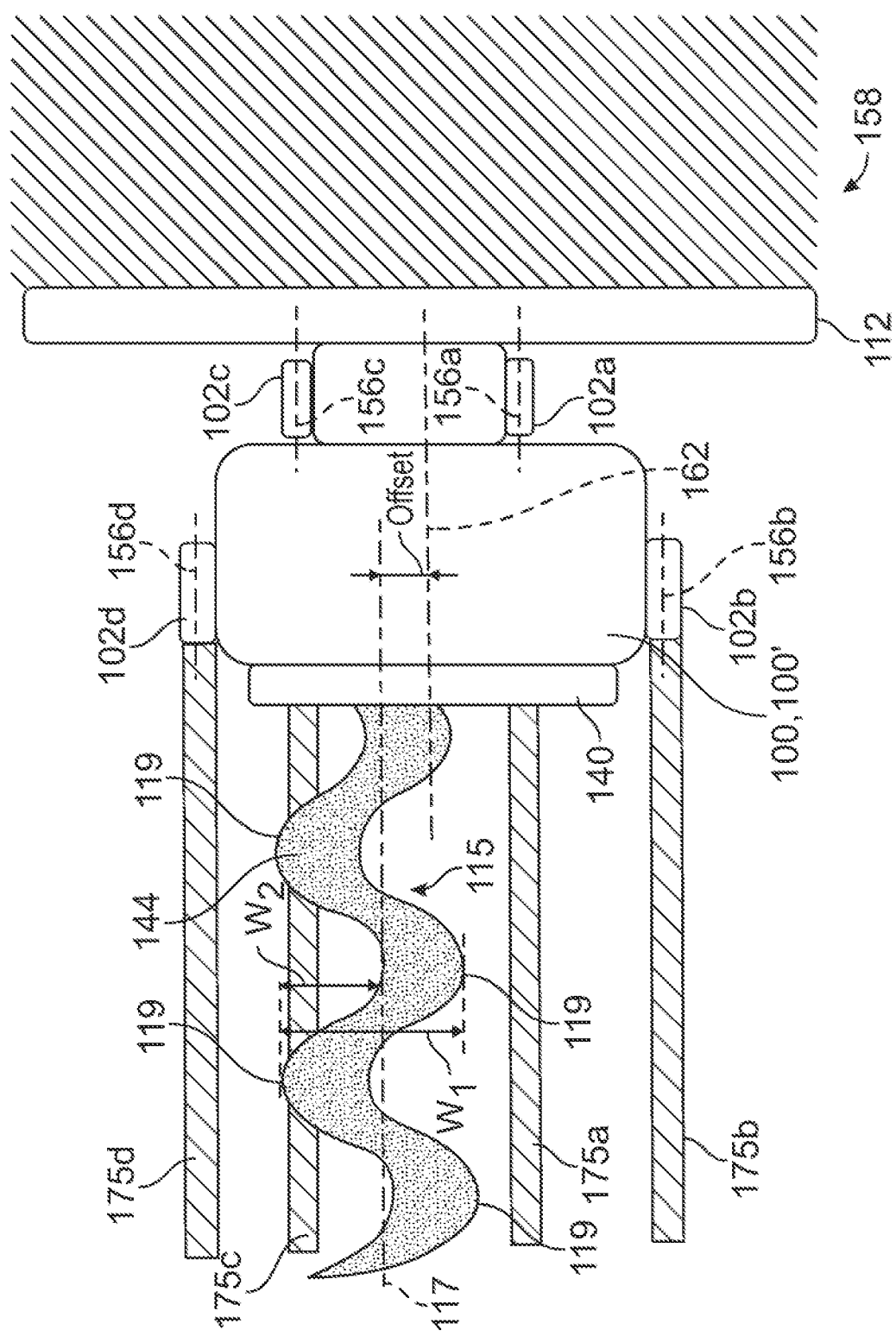
FIG. 9A is a top view of an exemplary windrower cutting crop and forming an offset windrow having a non-linear windrow pattern.

As shown in FIGS. 1 and 9A, the illustrated agricultural machine 100 includes ground engagement bodies 102*a-d*, such as, for example, wheels or tracks, that are coupled to a chassis of the agricultural machine 100. The ground engagement bodies 102*a-d*, which contact an adjacent ground surface 104, can be used in connection with propulsion of the agricultural machine 100 in at least a forward operating or travelling direction 106 along the ground surface 104. Additionally, an angular orientation of at least some of the ground engagement bodies 102*a-d* relative to the ground surface 104 can be adjusted in connection with steering or guiding the direction of travel of the agricultural machine 100.

The operation of the agricultural machine 100 can be controlled from at least an operator's cab 108. The operator's cab 108, in some embodiments, includes one or more controls for controlling the operation of the agricultural machine 100, including, but not limited to, controls relating to operating the agricultural machine 100 using an automated vehicle guidance system.

With respect to the exemplary agricultural machine 100 shown in FIG. 1, a front end of the agricultural machine 100 can be pivotally coupled to a feeder house 110 that supports a harvesting head 112. As the agricultural machine 100 moves along the ground surface 104 while performing an agricultural operation, such as, for example, harvesting a crop, an elongate reciprocating knife 114 at a front end of the harvesting head 112 can cut crop plants, with the cut crop material being deposited at or on the harvesting head 112. According to certain embodiments, the reciprocating knife 114 can have a length that extends across about the entire width of the harvesting head 112.

The harvesting head 112 can inwardly direct the cut crop material toward a central region of the agricultural harvesting head 112 where the cut crop can be carried via a conveyor along the feeder house 110 and into the agricultural machine 100. According to certain embodiments, the agricultural machine 100 can further include a threshing system 116 having a rotor 118 that is positioned within a concave 120. The rotor 118 can be configured to thresh the received crop material such that the crop material is sized to fall through openings in the concave 120 and into a cleaning shoe 122. Operation of a fan 124 of the cleaning shoe 122 can be used to separate portions of the crop material, such, as, for example, grain from at least some non-grain materials, such as, for example, straw. Moreover, by operating the fan 124, at least relatively light non-grain materials can be lifted and/or propelled through a sieve 126 and chaffer 128 of the cleaning shoe 122 in a generally rearward and upward direction such that the non-grain materials pass between the rotor 118 and the concave 120. The grain remaining in the cleaning shoe 122 can fall onto a pan 130 that is located at the bottom of the cleaning shoe 122 and be moved via operation of an auger 132 to a vertical conveyor 134 that can carry the grain to a grain tank or reservoir 136. The separated non-grain material can exit the threshing system 116 and be delivered for chopping by a rotary chopper 138.

Figure 2:
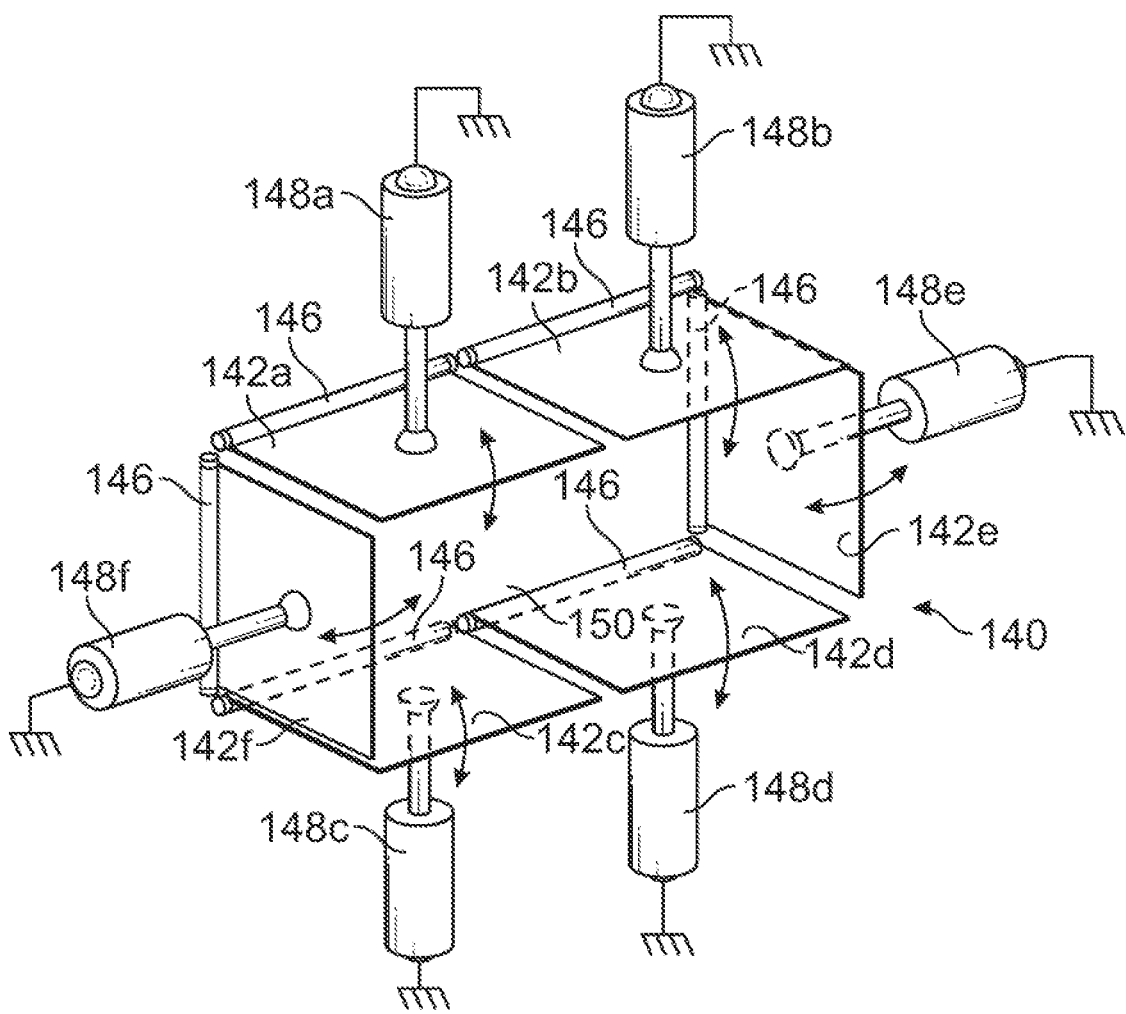
FIG. 2 is a perspective view of an exemplary diverter for the agricultural machine shown in FIG. 1.

Referencing FIGS. 1 and 2, a diverter 140 having a plurality of steering vanes 142*a-f* is positioned to deflect the direction of movement of the chopped non-grain crop material as the crop material exits the agricultural machine 100 through an aperture 150 at a rear end of the agricultural machine 100 and is deposited onto the ground surface 104 of the field. The crop material can be deposited on the field in a manner that forms a windrow 144 (FIG. 9A). As discussed below, according to certain embodiments of the subject disclosure, the plurality of steering vanes 142*a-f* can be operated in a manner that forms a windrow 144 having particular characteristics that can at least assist in limiting, and/or manage, the track paths of the engagement bodies 102a-d on the ground surface 104 of the field. Moreover, as illustrated in at least FIG. 9A, such track paths 175a-d, such as, for example, tire or wheel tracks or paths, in the ground surface 104 can be the location(s) on the ground surface 104 that plurality of engagement bodies 102a-d of the agricultural machine 100 traveled, and thus areas of potential soil compaction, while performing various agricultural operations in the field and/or during other travel along the ground surface 104.

As seen in FIG. 2, according to an exemplary embodiment, the steering vanes 142a-f of the diverter 140 can comprising one or more upper steering vanes 142a, 142b, one or more lower steering vanes 142c, 142d, at least one right side steering vane 142e, and at least one left side steering vane 142f As seen in FIG. 2, according to certain embodiments, the steering vanes 142a-f can have a generally planar configuration and can each be coupled at one side of the steering vanes 142a-f to the agricultural machine 100 via a hinge 146. Such pivotal movement of each of the steering vanes 142a-f can be facilitated by operation of an associated actuator 148a-f, which can be controlled, for example, by a control system 400 (FIG. 400) of the agricultural machine 100. According to certain embodiments, actuation of an actuator 148a-f can include extending the actuator 148a-f such that the associated steering vane 142a-f is pivotally displaced, or pushed, in a generally inwardly direction toward the aperture 150, and retracting the actuator 148a-f such that the associated steering vane 142a-f is pivotally displaced, or pulled, in a generally outwardly direction away from the aperture 150. Further movement of one of the steering vanes 142a-f via operation of the associated actuator 148a-f can be independent of the movement, if any, of other steering vanes 142a-f.

The hinges 146 coupled to the right and left side steering vanes 142e, 142f can accommodate pivotal movement of the right and left side steering vanes 142e, 142f along vertical axes. Accordingly, such that the right and left side steering vanes 142e, 142f can be pivotally displaced in generally left and right directions. Thus, pivotal movement of the right and left side steering vanes 142e, 142f about their respective hinges 146 can deflect the crop material that will be part of a windrow 144 in right and left directions, respectively. Operation of the right and left side steering vanes 142e, 142f can be in a timed and coordinated manner in which the right and left side steering vanes 142e, 142f are oscillated between right and left positions, which can assist in forming a windrow 144 having a windrow pattern 115 having a serpentine or waved shape of a particular width(s), as seen for example in FIGS. 9A and 9B. Further, operation of one or more of the actuators 148a-f can also be coordinated with the particular location at which the agricultural machine 100 is in the field, as indicated by information obtained by the location system 408 (FIG. 4). Additionally, as discussed below, such operation of the right and left side steering vanes 142e, 142f can assist in offsetting a centerline of the windrow 144 with respect to at least the associated first agricultural machine 100 so as to assist in centering the windrow 144 with respect to a central line of a second agricultural machine 200 (FIG. 3), such as, for example, a baler, that may subsequently collect and bale the crop material in the windrow 144, as discussed below.

The hinges 146 coupled to the upper and lower steering vanes 142a-d can accommodate pivotal movement of the upper and lower steering vanes 142a-d along horizontal axes. Thus, the upper and lower steering vanes 142a-d can be pivotally displaced in generally upward and downward directions. Such pivotal displacement can facilitate the upper and lower steering vanes 142a-d deflecting the crop material exiting through the aperture 150 in upward and downward directions. Further, according to certain embodiments, the upper and lower steering vanes 142a-d can comprise a left upper steering vane 142a and a right upper steering vane 142b, as well as a left lower steering vane 142c and a right lower steering vane 142d. The positioning of the upper and lower steering vanes 142a-d via operation of the associated actuators 148a-d can be utilized to control a thickness or height of the windrow 144. Accordingly, the height on one side of the windrow 144, such as right side, can be different then the height on the other, or left, side of the windrow 144 via differences in the positioning of the left and right side upper steering vanes 142a, 142b, and/or the differences in the positioning of the left and right side lower steering vanes 142c, 142d.

The configuration of the windrow 144 formed via operation of the agricultural machine 100 can also be influenced by other components of the agricultural machine 100. For example, the speed at which the rotary chopper 138 is driven by a motor 152 can impact the force at which crop material is forced through the aperture 150. Moreover, operating the motor 152, and thus, the rotary chopper 138, at higher speeds can increase the force at which crop material is expelled through the aperture 150, which can be attributed to an increase in a width of the windrow 144. Accordingly, a control system 400 (FIG. 4) of the first agricultural machine 100 can at least generate commands or signals to control the operating speed of the motor 152 so as to increase or decrease the width of the windrow 144. Additionally, the speed at which the fan 124 is operated can also impact the speed and/or force at which crop material that forms the windrow 144 is expelled from the agricultural machine 100. Thus, the control system 400 can also be adapted to generate commands or signals to control the operating speed of the fan 124 so as to increase or decrease the width of the windrow 144.

Figure 3:
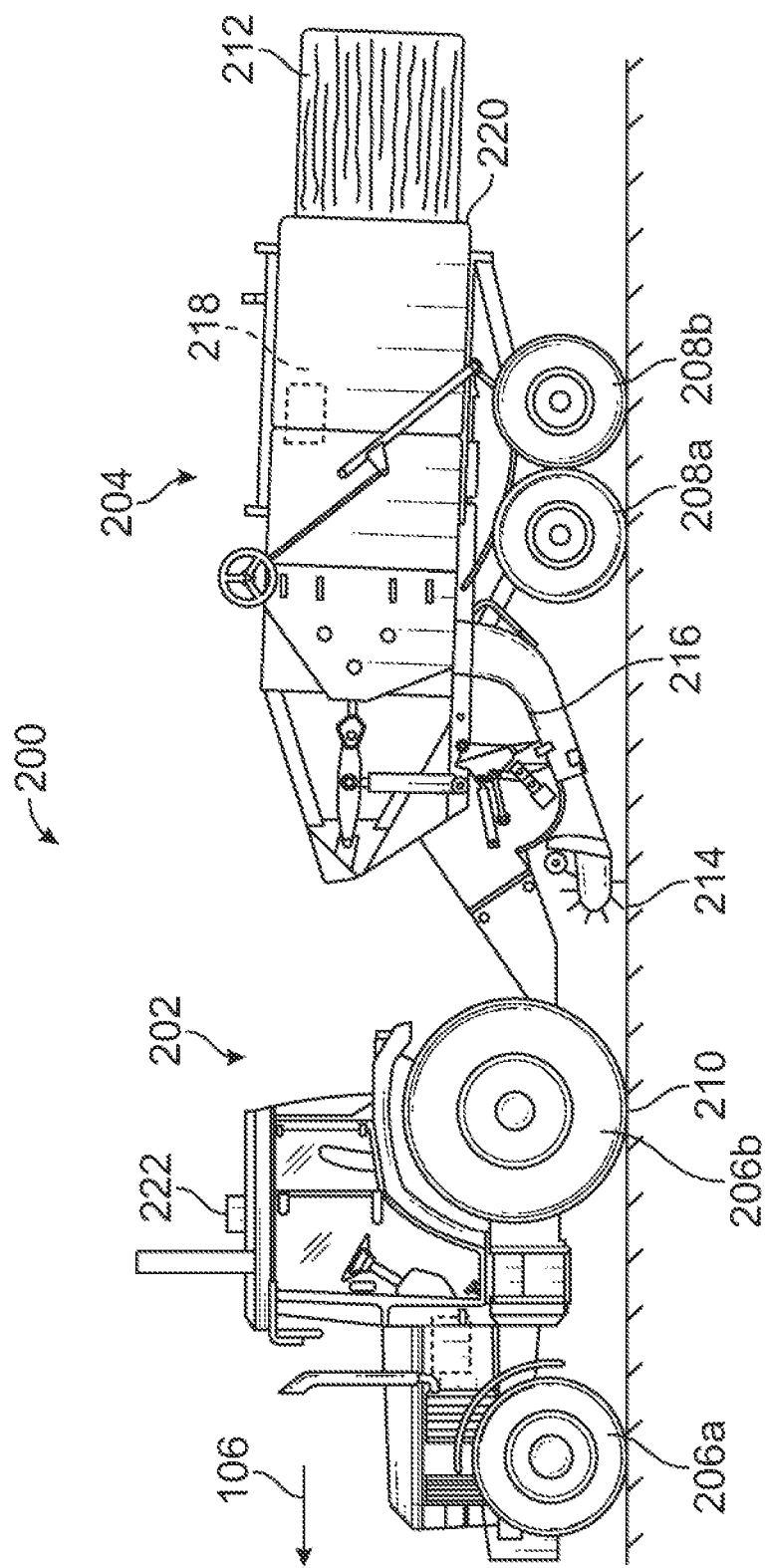
FIG. 3 is a side perspective view of an exemplary second agricultural machine in the form of a baler, and which includes an agricultural vehicle and a harvesting machine.
Figure 4:
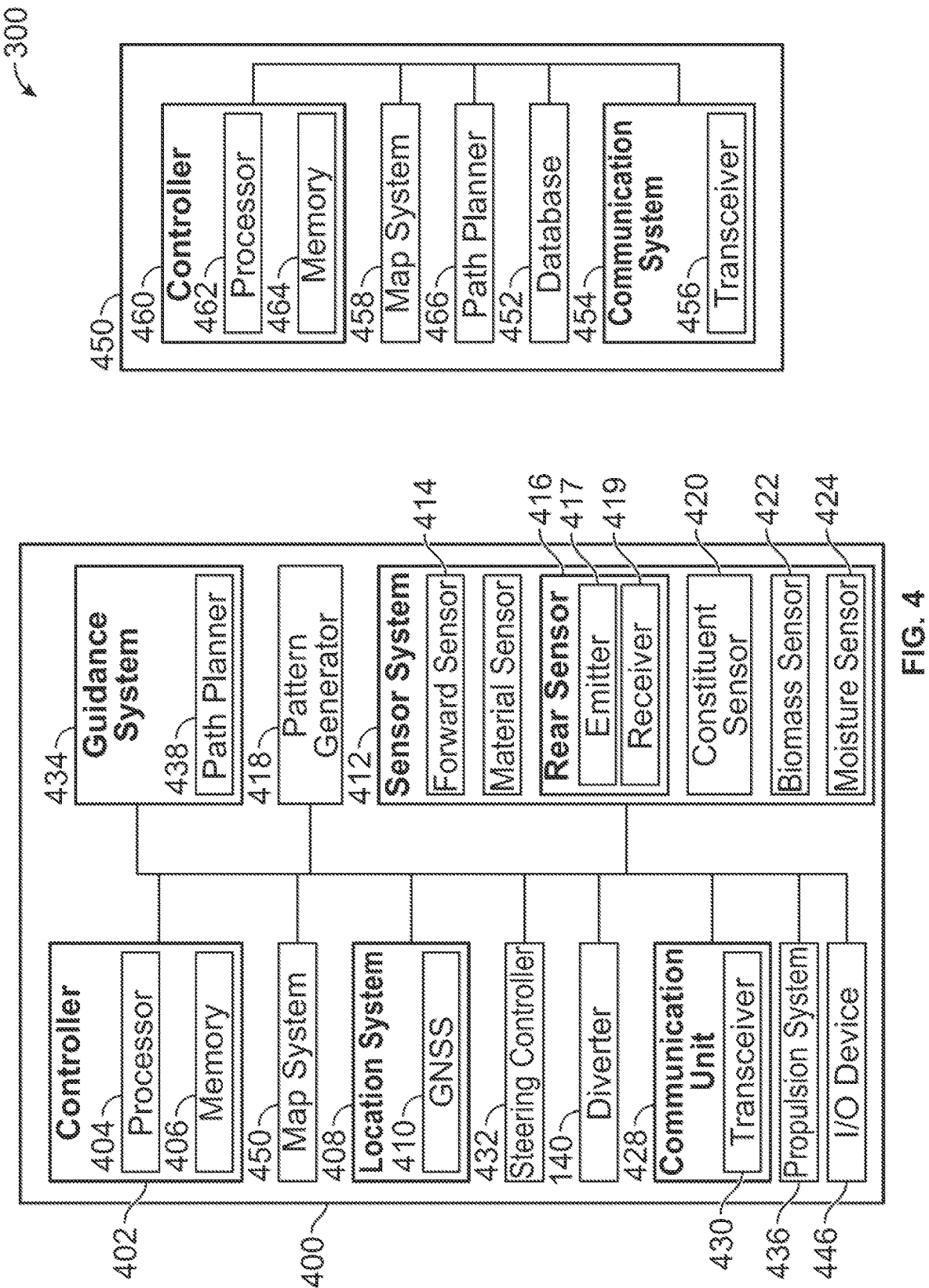
FIG. 4 is a diagrammatic view of a system for determining a travel path for, and controlling the diverter of, the exemplary first agricultural machine shown in FIG. 1.

Referring now to FIG. 3, an exemplary second agricultural machine 200 is depicted that includes an agricultural vehicle 202, such as, for example, a tractor, that is coupled to a harvesting machine 204. Moreover, in the illustrated embodiment, the second agricultural machine 200 is embodied as, or otherwise includes, a baler. However, similar to first agricultural machine 100, a variety of different agricultural machines can be utilized as the second agricultural machine 200, including, but not limited to, self-propelled forage harvesters and sprayers, among others. Additionally, while FIG. 2 illustrates the second agricultural machine 200 as including a harvesting machine 204 that is pulled, pushed, or towed by the agricultural vehicle 202, according to certain embodiments, the first agricultural machine 100 may also include a harvesting machine.

Figure 9B:
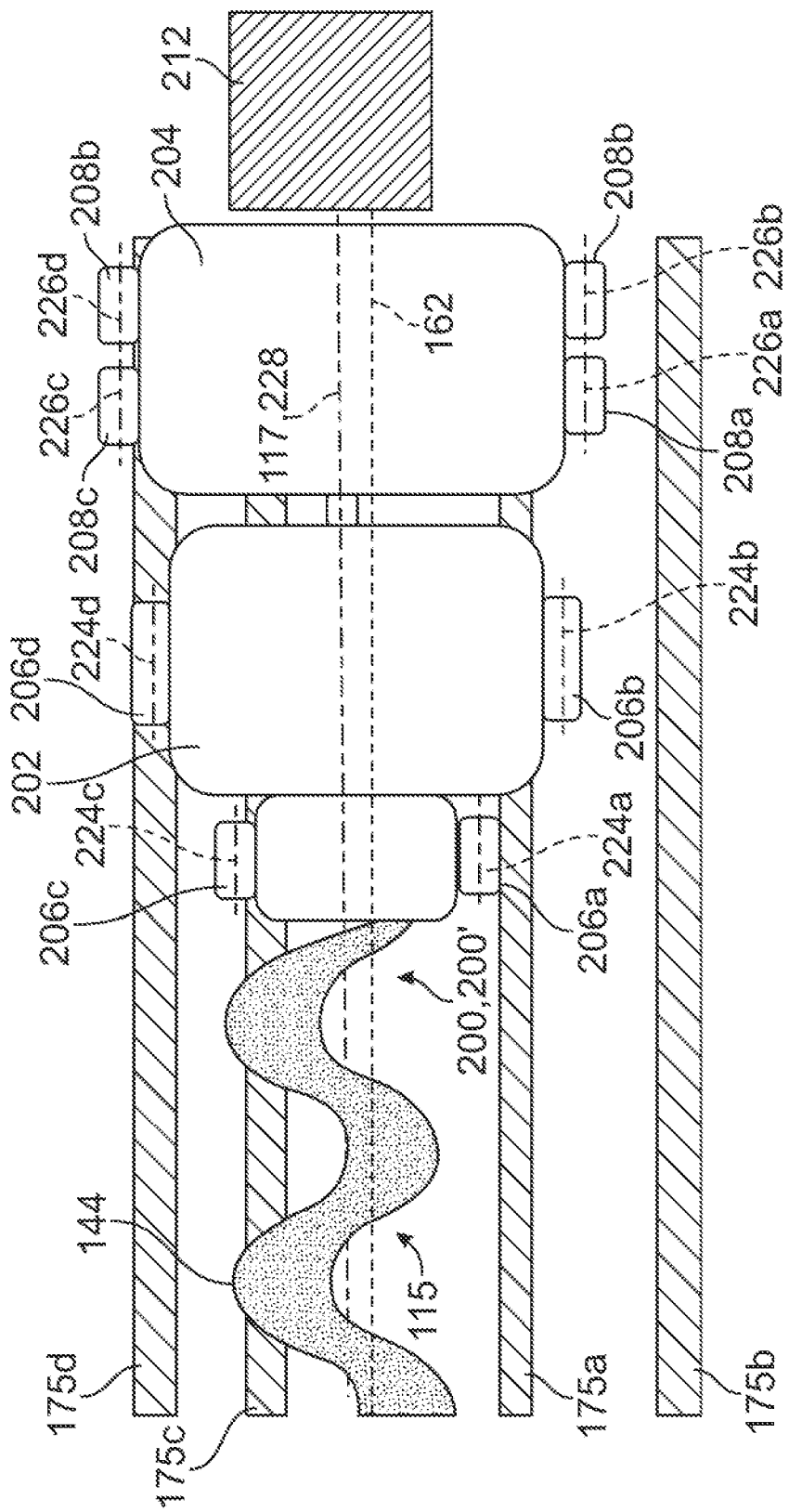
FIG. 9B is a top view of a baler traveling along at least one track path and collecting the windrow from FIG. 9A in connection with forming a crop bale.

As seen in FIGS. 3 and 9B, the agricultural vehicle 202 and harvesting machine 204 of the second agricultural machine 200 can each include a plurality of ground engagement bodies 206a-d, 208a-d, such as, for example, wheels or tracks. Similar to the ground engagement bodies 102a-d of the first agricultural machine 100, the ground engagement bodies 206a-d, 208a-d of the second agricultural machine 200 contact the adjacent ground surface 210, and are used in connection with propulsion of the second agricultural machine 200 in at least the forward operating or travelling direction 106 along the ground surface 210. Additionally, an angular orientation of at least some of the ground engagement bodies 206a-d, 208a-d relative to the ground surface 210 can be adjusted in connection with steering or guiding the direction of travel of the second agricultural machine 200.

According to certain embodiments, the second agricultural machine 200 is to perform an agricultural operation subsequent to the agricultural operation perform by the first agricultural machine 100. For example, in the depicted embodiments, the first agricultural operation performed by the first agricultural machine 100 can relate to cutting a crop plant so as to form a windrow 144, while the second agricultural operation performed by the second agricultural machine 200 can relate to a later collection or baling of at least a portion of the cut crop material, such as, for example, baling, among other agricultural operations. However, the first and second agricultural operations can relate to a variety of other agricultural operations, including, but not limited to, planting and spraying, among other operations. Further, the first and second agricultural operations can be similar operations, such as, for example, operations that occur at different seasons or years. For example, according to certain embodiments, the first operation can be a planting operation during a first season, and the second operation can relate to a planting operation that occurs at a later season or later time. Thus, while according to certain embodiments the first and second agricultural machines 100, 200 can be different machines, and/or include different implements that are utilized to perform different agricultural operations, according to other embodiments the first and second agricultural machines 100, 200 can be the same or similar agricultural machines that perform the same or similar operations at different times, including different seasons and calendar years.

In the illustrated example, the second agricultural machine 200 is capable of traversing the field, collecting crop material from the windrow 144 from the field, and processing the collected crop material to form crop bales 212 (FIG. 9B). Accordingly, in the exemplary embodiment, the harvesting machine 204 of the second agricultural machine 200 can include one or more mechanisms that cooperate to collect and deliver crop material from the windrow 144 into a baling or compression chamber 218 of the harvesting machine 204. For example, the harvesting machine 204 of the second agricultural machine 200 can include a pick-up mechanism 214 that is configured to gather crop material from the windrow 144 and feed it, via a loading mechanism 216, toward the baling or compression system 218. The pick-up mechanism 214 can include devices such as tines, forks, augers, conveyors, baffles, cutters, pre-cutter assemblies, the like, or any combination thereof. The loading mechanism 216 can include devices such as projections, tines, forks, knives, the like, or any combination thereof. Additionally, according to certain embodiments, the harvesting machine 204 can include a dosing system 526 (FIG. 5) that is configured to spray collected crop material, such as, for example, with a preservative or other formulation.

The baling or compression system 218 can include at least one baler or compression mechanism or chamber that is capable of compressing and/or shaping the collected crop material from the windrow 144 into one or more crop bales 212. The compression system 218 can be powered by a drive unit such as, for example, a motor, engine, or prime mover that is capable of propelling the second agricultural machine 200 and/or the agricultural vehicle 202. For example, rotational power from a power source such as, for example, a drive unit of the second agricultural machine 200, can be provided or transmitted to the compression system 218 via use of a power-takeoff (PTO) shaft that is coupled to the power source. The PTO shaft can be directly or indirectly coupled to the compression system 218. Crop bales 212 formed by the second agricultural machine 200 can be ejected from a tailgate or rear door 220 of the harvesting machine 204.

Figure 5:
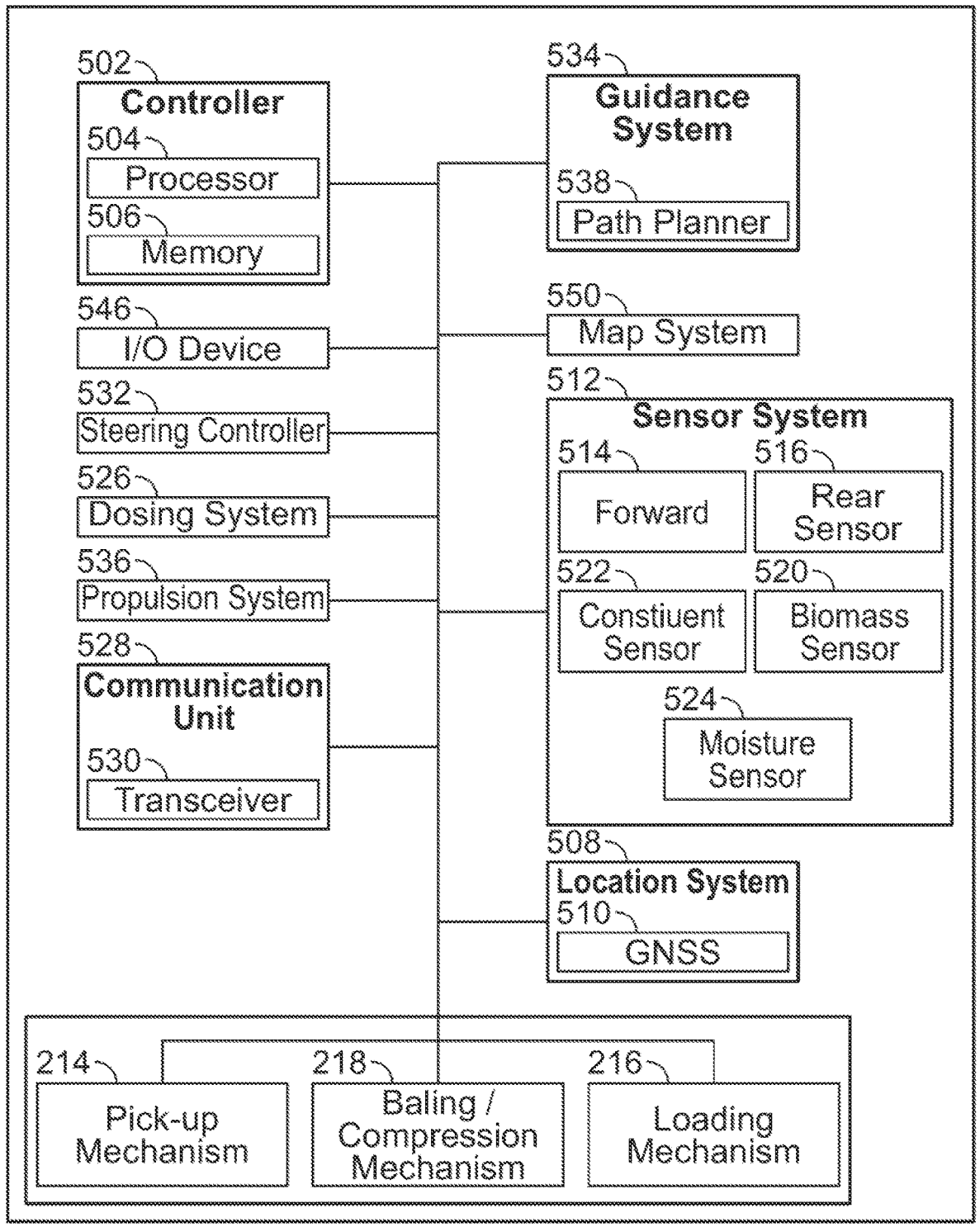
FIG. 5 is a diagrammatic view of a control system for determining a travel path for, and controlling the operation of, the exemplary second agricultural machine shown in FIG. 3, and which can be part of the system shown in FIG. 4.

FIGS. 4 and 5 illustrate at least a portion of a system 300 for controlling and/or minimizing soil compaction associated with wheel or track paths of agricultural machines, such as the track paths associated with the first and second agricultural machines 100, 200, among others. As seen in FIG. 4, the system 300 can include the first control system 400 of the first agricultural machine 100 and a central system or storage location 450. As seen in FIG. 5, the system 300 can further include a second control system 500 of the second agricultural machine 200. As discussed below, the first and second control systems 400, 500 can be in communication with the central system 450, as well as with each other, such that the first and second control systems 400, 500 of the first and second agricultural machines 100, 200, respectively, can receive information from the central system 450 relating to track paths for the first and second agricultural machines 100, 200 in the field, as well to communication to the central system 450 to update traffic or travel map(s) that may be maintained by the central system 450.

As seen in FIGS. 4 and 5, according to an illustrated embodiment, the first and second control systems 400, 500 each include one or more computing devices, such as, for example, one or more controllers 402, 502. The controllers 402, 502 of the control systems 400, 500 can be configured to execute various control and/or computational functions of the associated first and second agricultural machines 100, 200, respectively. As such, the controllers 402, 502 can be communicatively coupled to various actuators, sensors, and other devices within, or remote from, the associated agricultural machine 100, 200. Accordingly, with respect to the illustrated first agricultural machine 100, the controller(s) 402 can be configured to operate and control the diverter 140, including, for example, control the movement and/or positioning of the actuators 148a-f of the diverter 140, and thereby control the positioning and/or movement of the steering vanes 142a-f. Such control of the diverter 140, among other systems and subsystems of the first agricultural machine 100 can control characteristics of the windrow 144 that is formed by the first agricultural machine 100, including, for example, the position, shape, height, and/or width of the windrow 144, among other characteristics of the windrow 144. Further, with respect to the illustrated second agricultural machine, the controller(s) 502 of the control system 500 of the second agricultural machine 200 can be used to control operation of the compression system 218, pick-up mechanism 214, and/or loading mechanism 216.

In some embodiments, each controller 402, 502 can include one or more processors 404, 504. Each processor 404, 504 can be embodied as any type of processor or other compute circuit capable of performing various tasks such as compute functions and/or controlling the functions of the associated first or second agricultural machine 100, 200 depending on, for example, the type or intended functionality of the associated first or second agricultural machine 100, 200, and/or computational functions relating to the operations of the associated first or second agricultural machine 100, 200. In some embodiments, each processor 404, 504 can be embodied as a single or multi-core processor, a microcontroller, or other processing/controlling circuit. Additionally, in some embodiments, each processor

404, 504 may be embodied as, include, or be coupled to an FPGA, an application specific integrated circuit (ASIC), reconfigurable hardware or hardware circuitry, or other specialized hardware to facilitate performance of the functions described herein. In some embodiments still, each processor 404, 504 can be embodied as a high-power processor, an accelerator co-processor, an FPGA, or a storage controller.

In some embodiments, each controller 402, 502 can include one or more memory devices 406, 506. Each memory device 406, 506 can be embodied as any type of volatile (e.g., dynamic random access memory (DRAM), etc.) or non-volatile memory capable of storing data therein. Volatile memory can be embodied as a storage medium that requires power to maintain the state of data stored by the medium. Non-limiting examples of volatile memory can include various types of random access memory (RAM), such as dynamic random access memory (DRAM) or static random access memory (SRAM). In some embodiments, each memory device 406, 506 can be embodied as a block addressable memory, such as those based on NAND or NOR technologies. Each memory device 406, 506 can also include future generation nonvolatile devices or other byte addressable write-in-place nonvolatile memory devices. Additionally, in some embodiments, each memory device 406, 506 can be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 406, 506 can refer to the device itself and/or to a packaged memory product. In some embodiments still, 3D crosspoint memory can comprise a transistor-less stackable cross point architecture in which memory cells sit at the intersection of word lines and bit lines and are individually addressable and in which bit storage is based on a change in bulk resistance. In some embodiments yet still, all or a portion of each memory device 406, 506 can be integrated into the processor(s) 404, 504. Regardless, each memory device 406, 506 can store various software and data used during operation such as task request data, kernel map data, telemetry data, applications, programs, libraries, and drivers.

According to certain embodiments, each control system 400, 500 can include a location system 408, 508, such as, for example, a global navigation satellite system (GNSS) 410, 510, including, but not limited to, a global positioning system (GPS). The GNSS 410, 510 can be operated to provide a detailed indication of the location of the associated agricultural machine 100, 200, particularly as the agricultural machine 100, 200 traverses across the field. For example, according to certain embodiments, each GNSS 410, 510 can include a receiver 154, 222, that can receive information from an external source that can indicate the particular location of the agricultural machine 100, 200, including, for example, via location coordinates. Further, the known location of the receiver 154, 222 relative to other components of the agricultural machine 100, 200 can provide an indication of the location, including location during travel, of those particular components of the agricultural machine 100, 200. For example, knowing the location and/or position of each engagement body 102a-d, 206a-d, 208a-d of the agricultural machine 100, 200 relative to the receiver 154, 222, and using location information received from the location system 408, 508, the controller 402, 502, or other components of the associated system 300 can calculate or otherwise determine the location at which each of engagement body 102a-d, 206a-d, 208a-d is traveling or has travelled along the field. Such information can correspond to travel in the field along a centerline 156a-d, 224a-d, 226a-d FIGS. 9A, 9B) of the engagement bodies 102a-d, 206a-d, 208a-d, respectively. Additionally, or alternatively, if information regarding the width of an engagement body (ies) 102a-d, 206a-d, 208a-d is also known, such a determination of location information for the engagement body (ies) 102a-d, 206a-d, 208a-d can include determining the width of the travel path of that engagement body(ies) 102a-d, 206a-d, 208a-d in the field.

As also seen in FIGS. 4 and 5, the control systems 400, 500 for each of the first and second agricultural machines 100, 200 can each include a sensor system 412, 512. The types of sensors utilized by the first and second agricultural machines 100, 200 can be based, at least on part, on the type of agricultural machine and/or the type of agricultural operation that is to be performed by the agricultural machine 100, 200. Thus, the sensor systems 412, 512 for the first and second agricultural machines 100, 200 may or may not be similar, and moreover, may have at least some of the same type of sensors, as well as different types of sensors. For example, according to certain embodiments, the sensor systems 412, 512 can each include a forward sensor 414, 514, such as, for example, a crop sensor. Moreover, the forward sensor 414, 514 can be adapted to detect the presence of a crop 158 (FIG. 9A) and/or windrow 144 that is positioned adjacent to a front end of the associated agricultural machine 100, 200. Thus, the forward sensor 414, 514 can be an optical sensor that can use a camera, a radar sensor, or a mechanical sensor, among other types of sensors.

The sensor systems 412, 512 can also each include a rear sensor 416, 516 that can detect the presence of a crop material behind the agricultural machine 100, 200, including, for example, detect the presence, orientation, or other attributes of the windrow 144 or crop bale 212. According to certain embodiments, the rear sensor 416 can be a camera 160 (FIG. 1) that can capture an image(s) of the windrow 144 or crop bale 212. Additionally, or alternatively, the rear sensor 416, 516 can be configured to utilize LIDAR or a flash-lamp pumped (FLP) system in which the rear sensor 416, 516 includes one or more emitters 417 and receivers 419, as shown in FIG. 4.

Information obtained from the rear sensor 416, 516 can be utilized to obtain a relative position of the crop material, such as, for example, a location of the windrow 144 or crop bale 212 relative to one or more locations of the associated agricultural machine 100, 200. Similar to determining the locations of the engagement bodies 102a-d, 206a-d, 208a-d, information regarding the relative location of crop material such as the windrow 144 and crop bale 212, can be used in connection with location information obtained by the location system 408, 508 to determine and/or map the actual location of the crop material in the field. Such location information can then be used at least in part in determining a travel path for a subsequent agricultural operation, including, for example, baling the material in the windrow 144 and/or travel of a picker that retrieves crop bales 212 from the field. With respect to the illustrated first agricultural machine 100, information obtained by the rear sensor 416 can also be utilized in determining a shape, such, as, for example, a height and/or width, of the windrow 144.

Additionally, as also seen in FIGS. 4 and 5, the sensor systems 412, 512 can include sensors that sense one or more properties of the crop material that is passing through the agricultural machine 100, 200. For example, according to certain embodiments, one or both of the sensor systems 412, 512 can include a biomass sensor 420, 520 a constituent sensor 422, 522, and/or a moisture sensor 424, 524. Information regarding the moisture content of the cut crop material, as well as information regarding ambient temperature conditions, can influence the manner in which the diverter 140 is operated such that the windrow 144 formed by the agricultural machine 100 has a height and/or width that can accommodate drying of the cut crop material contained therein in manner that may prevent the crop material from becoming overly dry and/or damaged. Similarly, information from such sensors 520, 522, 524, including, for example, moisture content, can guide the operation of the second agricultural machine 200, including, for example, the densities of the crop bales 212 that are being formed. Moreover, information regarding moisture content that is provided by such sensors 520, 522, 524 can influence the amount of crop material that is to be contained crop bales 212, thereby impacting the density of the crop bales 212. Further, with respect to at least the second agricultural machine 200, which has a dosing system 526 (FIG. 5), detection of properties of the crop materials via use of the biomass sensor 520, a constituent sensor 522, and/or a moisture sensor 524 can influence the rates at which a formulation, such as, for example, a preservative, is sprayed onto the crop material by one or more sprayers or nozzles the dosing system 526. While the foregoing discusses a dosing system 526 with respect to the second agricultural machine 200, a similar dosing system can also be included with, or otherwise utilized by, the first agricultural machine 100.

Each control system 400, 500 can also include a communication unit 428, 528 that can accommodate the communication of information from, and to, the control system 400, 500. The communication units 428, 528 can be configured for wired and/or wireless communications including, for example, via proprietary and/or non-proprietary wireless communication protocols. For example, the communication units 428, 528 can be configured to accommodate communications Wi-Fi, ZigBee, Bluetooth, radio, cellular, or near-field communications, among other communications that use other communication protocols. According to certain embodiments, the communication units 428, 528 can each comprise a transceiver 430, 530.

A steering controller 432, 532 can at least assist in controlling one or more steering systems of the associated agricultural machine 100, 200, including, for example, a front steering system and/or a rear steering system of the agricultural machine 100, 200. The steering controller 432, 532 can also provide commands for controlling a steering system(s) of the harvesting machine 204 or other implement or tool, if any, that may be coupled or attached to the agricultural machine 100, 200. Thus, for example, in at least some embodiments, the steering controller 432, 532 can operably, and independently, control both a front steering system and a rear steering system of an agricultural machine 100, 200. Such control of one or more steering systems of the agricultural machine 100, 200 using the steering controller 432, 532 can include controlling electronic steering systems. For example, the steering controller 432, 532 can provide signals to operate one or more electric motors and/or actuators that are coupled to, and control the turning and/or the driving of, front and/or rear engagement bodies 102a-d, 206a-d, 208a-d and/or an associated front or rear axle of the agricultural machine 100, 200. Alternatively, for hydraulic steering systems, the steering controller 432, 532 can control the flow of a steering fluid utilized in connection with turning and/or driving the front or rear engagement bodies 102a-d, 206a-d, 208a-d and/or associated front or rear axle(s) of the agricultural machine 100, 200. Thus, such control can include the steering controller 432, 532 generating signals that control the operation of a pump(s) and/or the control opening/closing of valves that are used in connection with controlling the flow of the steering fluid.

The control systems 400, 500 can each also include a guidance system 434, 534 that can be configured to guide, using at least inputted or received information, the travel of the associated agricultural machine 100, 200 through the field, including while performing an agricultural operation. The guidance system 434, 534 can also provide information used to control the force and/or power outputted by a propulsion system 436, 536, such as, for example, an engine or motor system, in connection with at least controlling the speed at which the agricultural machine 100, 200 travels along at least portions of the field. The guidance provided by the guidance system 434, 534 can include, at least according to certain embodiments, instructions or commands used by the steering controller 432, 532 in connection with controlling the operation of the associated steering system, including, for example, in connection with steering or otherwise controlling the direction of travel of the agricultural machine 100, 200. Moreover, the guidance system 434, 534 can provide instructions that are utilized by at least the steering controller 432, 532 and steering system in connection with guiding or controlling the direction of travel and/or direction of movement of the agricultural machine 100, 200, including guiding movement along one or more selected paths of travel. The guidance system 434, 534, as well as the steering controller 432, 532, can be embodied as hardware, firmware, software, virtualized hardware, emulated architecture, and/or a combination thereof.

According to certain embodiments, the guidance system 434, 534 can include a path planner 438, 538, which can be embodied as hardware, firmware, software, virtualized hardware, emulated architecture, and/or a combination thereof. According to certain embodiments, the path planner 438, 538 is configured to analyze information regarding at least the conditions and/or properties of the field in which the agricultural machine 100, 200 is to travel in connection with determining a path of travel that may at least attempt to minimize soil compaction in the field. Additionally, or alternatively, the path planner 438, 538 can also be configured to at least attempt to minimize soil compaction in the field by determining a location of one or more preexisting track paths 175a-d, such as, for example wheel tracks, that corresponds to locations at which one more engagement bodies 102a-d, 206a-d, 209a-d of the agricultural machines 100, 200, among other vehicles, have already travelled in the field. The determinations made by the path planner 438, 538 can be used, at least in part, by the guidance system 434, 534 to issue commands for at least the steering controller 432, 532 and/or propulsion system 436, 536 so that the associated agricultural machine 100, 200 is guided and/or steered while traveling in the field along a determined travel path. Thus, to do so, the path planner 438, 538 can perform at least some of the method 600 described below with respect to FIG. 6.

As seen in FIG. 4, according to embodiments in which an agricultural machine, such as, for example, the first agricultural machine 100, includes a diverter 140 for forming a windrow 144, the control system 400 can also include a pattern generator 418. The pattern generator 418, which can be embodied as hardware, firmware, software, virtualized hardware, emulated architecture, and/or a combination thereof, can be configured to determine the size, shape, and/or location of the windrow 144 that will be formed by the first agricultural machine 100 during the associated agricultural operation. Moreover, the pattern generator 418 can be configured to determine commands for operation of the actuators 148a-f of the diverter 140 in connection with providing the windrow 144 with a particular windrow pattern 115 (FIGS. 9A, 9B), which may, for example, be a non-linear pattern in a direction that is parallel to a direction of travel of the first agricultural machine 100, as indicated by the oscillating or serpentine windrow pattern 115 shown in FIGS. 9A and 9B. Thus, to do so, the pattern generator 418 can perform at least some of the method 700 described below with respect to FIG. 7.

The control systems 400, 500 can also each include a mapping system 440, 540, which can be embodied as hardware, firmware, software, virtualized hardware, emulated architecture, and/or a combination thereof. The mapping system 440, 540 is configured to selectively map and/or record the track paths 175a-d where one or more engagement bodies 102a-d, 206a-d, 208a-d of the associated agricultural machine 100, 200 contact and travel along the field. According to certain embodiments, the mapping system 440, 540 can be configured to update an existing traffic or travel map that may contain historical information regarding track paths 175a-d, including, for example, track paths 175a-d, corresponding to prior travel of the agricultural machines 100, 200, or other agricultural machines. Information from the mapping system 450, 550, can also provide information to the guidance system 434, 534, and in particular, the path planner 438, 538, in connection with an identification of previous, or currently existing, track paths 175a-d. Additionally, the mapping system 440, 540 can map information regarding certain properties and/or conditions of the field, including, for example, information regarding soil compositions and/or moisture content. Accordingly, the mapping system 440, 540 can perform at least some of the method 600 described below with respect to FIG. 6.

According to certain embodiments, the system 300 can also include a central system 450. The central system 450 can take a variety of forms, including, for example, being a cloud based database 452. Additionally, or alternatively, the central system 450 may or may not be local relative to one or more of the agricultural machines 100, 200. The central system 450 can provide a database 452 that can store traffic or travel maps, as well as receive information regarding the properties and/or conditions of the crop plants, crop materials, windrow, and/or the fields on which the agricultural machines 100, 200 may travel. For example, according to certain embodiments, the central system 450 can include a communication system 454 that can have a transceiver 456. The communication system 454 of the central system 450 can receive information from the control systems 400, 500 of the agricultural machines 100, 200 regarding the locations at which the agricultural machines 100, 200 have traveled and/or are to travel. Using such information, a mapping system 458 of the central system 450 can generate, and/or update, a traffic or travel map that may be stored in the database 452 that indicates the track paths 175a-d associated with the communicated travel of the agricultural machines 100, 200. Additionally, according to certain embodiments, the central system 450 can have, and/or receive, information regarding properties pertaining to the agricultural machines 100, 200 that the mapping system 458 and/or controller 460 of the central system 450 can utilize to determine the width of the track paths 175a-d associated with the communicated travel of the agricultural machines 100, 200. Again, as with the control systems 400, 500, such information can be determined, at least in part, via use of the locations of the engagement bodies 102a-d, 206a-d, 208a-d relative to the associated location of the receiver 154, 222 of the location system 408, 508, and using information regarding the width of the associated engagement body 102a-d, 206a-d, 208a-d. Additionally, or alternatively, information from updated traffic or travel maps that are communicated via the communication systems 454, 554 of the agricultural machines 100, 200 to the communication unit 428, 528 of the central system 450 can be used by the mapping system 458 of the central system 450 to update a corresponding traffic or travel map(s) that may be stored in the database 452 of the central system 450. According to certain embodiments, the controller 460 of the central system 450, including the associated processor 462 and memory device 464, can be similar to the above-discussed controllers 402, 502, processors 404, 504, and memory devices 406, 506 of the control systems 400, 500 of the agricultural machines 100, 200.

Figure 6:
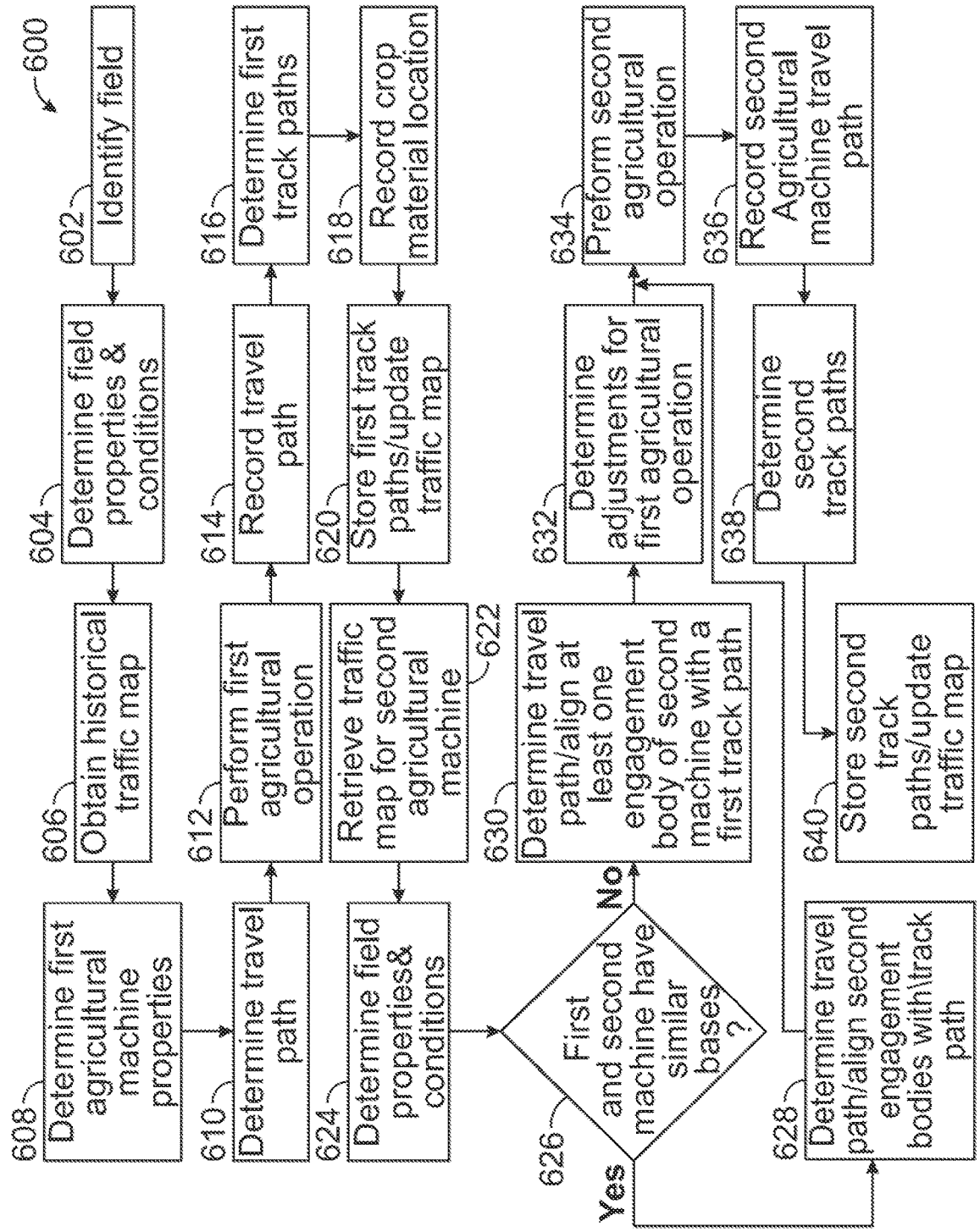
FIG. 6 is a simplified flowchart of a method that can be performed by the systems shown in FIGS. 4 and 5 in connection with determining track paths for the exemplary first and second agricultural machines shown in FIGS. 1 and 3.

Referring now to FIG. 6, an illustrative method 600 is provided for operating the system 300 to minimize soil compaction in a field. The method 600 corresponds to, or is otherwise associated with, performance of the blocks described below in the illustrative sequence of FIG. 6. It should be appreciated, however, that the method 600 may be performed in one or more sequences different from the illustrative sequence.

At block 602, the field in which the first agricultural machine 100 will operate is identified. Such identification can occur in a number of ways, including, for example via an operator of the agricultural machine 100 identifying the field by use of an input/output (I/O) device 446 that can be part of the control system 400. Such I/O devices 446 of the first agricultural machine 100, as well as an I/O device 546 of the second agricultural machine 200, can include, but are not limited to, a keyboard, display, touch screen, and/or mouse, as well as a combination thereof, among other I/O devices. Additionally, or alternatively, the field can be identified via use of the location system 408 of the agricultural machine 100, and a determination that the agricultural machine 100 is positioned at or adjacent to the field.

At block 604, the control system 400 and/or the central system 450, including, for example, the associated path planner 438, 466, can determine field conditions and/or properties. Such determinations can be based on a variety of different types of information that can be provided the control system 400, central system 452, and/or path planner 438, 466. For example, according to certain environments, field properties may relate to features of the field, such as, for example, soil content or composition and topography. Information regarding soil content or composition can, for example, be provided in the form of a soil content map(s), which can indicate whether particular areas in the field have a relatively larger sand content. Such information can be used to determine which areas of the field may be wetter, and thus more susceptible to soil compaction, than other portions of the field. Field properties can also relate to the shape and/or topography of the field, which can further indicate the portions of the field that may be wetter and/or dry faster than other areas of the field. Additionally, field properties can relate to a field moisture attribute, which can be information regarding a soil moisture content and/or a crop moisture content.

Figure 7:
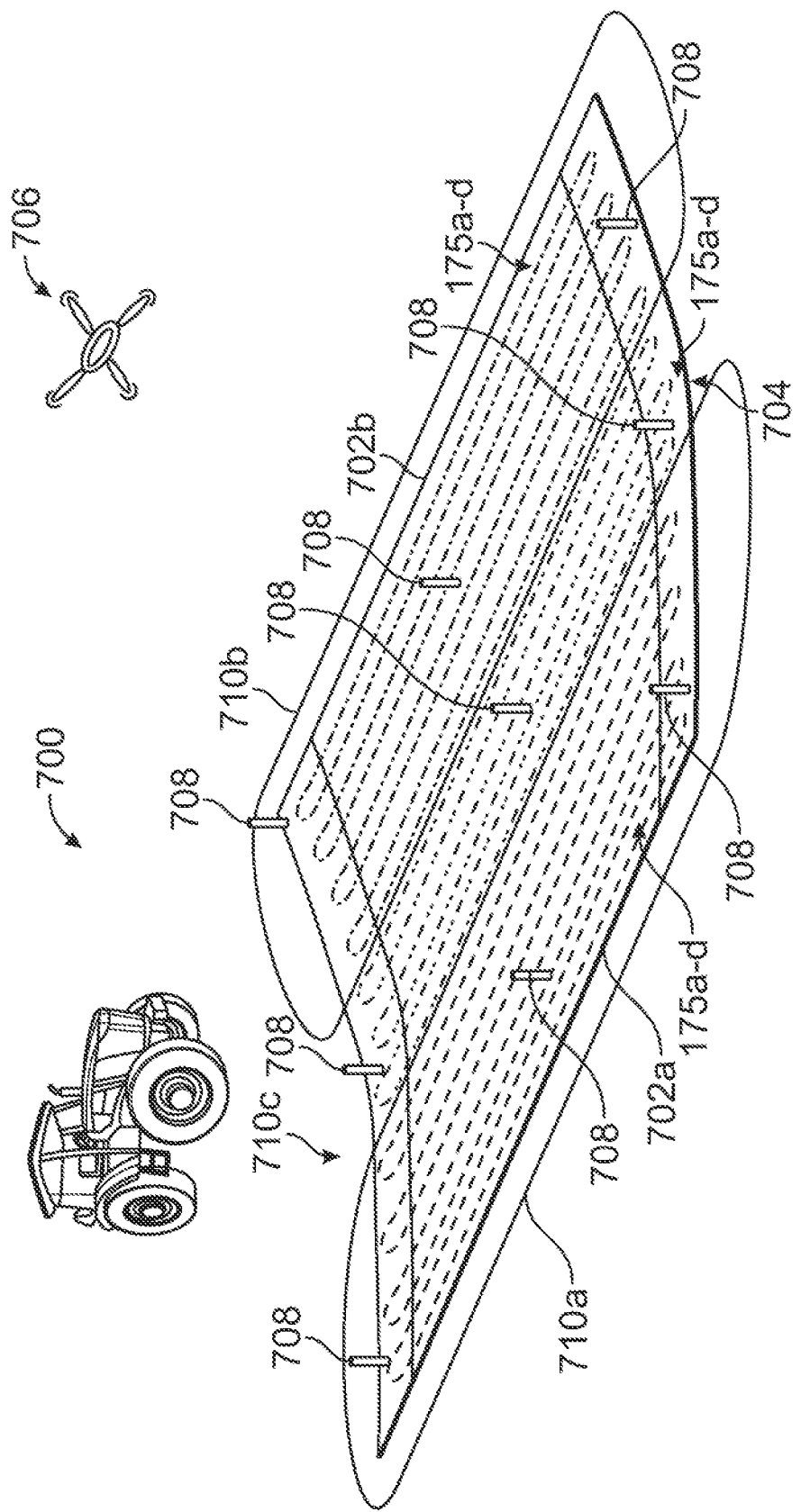
FIG. 7 is a depiction of an exemplary field and indicates a proposed sequence of travel for an agricultural machine.

For example, referencing FIG. 7, certain fields, such as the field 700 shown in FIG. 7, can be identified as having a relatively concave shape. In such situations the field can generally slope inwardly from opposing outer sides 702a, 702b of the field to a central region 704 of the field 700. With such a shape, the soil in the areas around the higher outer sides 702a, 702b of the field 700 can be estimated to dry faster than soil that is closer to the central region 704 of the field 700. Such information may indicate, at least at certain times, the soil in the vicinity of the central region 704 maybe wetter than other areas of the field 700, and thus potentially more susceptible to soil compaction associated with travel of the agricultural machine 100, 200 in that area of the field 700. Information regarding field properties, including, for example, soil content and topography, can be obtained in a variety of manners, including, for example, by one more cameras or sensors that are attached to an aerial vehicle, including, for example, an unmanned aerial vehicle or drone 706. Field conditions, which can indicate current or relatively current conditions in the field 700, can also be monitored and detected in a variety of other manners. For example, referencing FIG. 7, moisture probes 708 can be positioned at various locations throughout the field 700. Such moisture probes 708 can wirelessly communicate information regarding current soil moisture levels in the adjacent area to one or more of the central system 450 and/or a control system(s) 400, 500, such as, for example, via the associated communication unit(s) 428, 454, 528.

At block 606, to the extent a historical traffic or travel map exists, the path planner 438 and/or map system 450 of the control system 400 can obtain a historical traffic or travel map, for the field that was identified at block 602. According to certain embodiments, the path planner 438 and/or map system 450 can retrieve the traffic or travel map for the identified field from the central system 450, including from the database 452, via communication between the associated communication units 428, 454. The historical traffic or travel map can provide an indication of the previous recorded locations at which engagement bodies 102a-d, 206a-d, 208a-d of agricultural machines 100, 200 had been traveled across the field. Such recorded travel locations can be associated with prior travels of the same agricultural machine 100 for which a travel path is currently being planned, and/or associated with the travel of other agricultural machines, such as, for example, the second agricultural machine 200, in the field.

Turning to block 608, at block 608 the path planner 438, 466 can obtain properties of the agricultural machine 100 that will be traveling through the field. Such properties can include, for example, the relative locations of the engagement bodies 102a-d of the agricultural machine 100, including the locations of the engagement bodies of any associated harvesting machine of the agricultural machine 100. The properties of the agricultural machine 100 that are obtained by the path planner 438, 466 can also include anticipated loads associated with one or more of the engagement bodies 102a-d. The path planner 438, 466 can utilize such load information to identify the engagement body(ies) 102a-d that may impart a larger load on the adjacent ground surface than other engagement bodies 102a-d, and thus may have the potential to cause a relatively higher degree or level of soil compaction.

The path planner 466 of the central system 450, and/or the path planner 438 of the agricultural machine 100 that will be traveling through the field, can utilize the information obtained at blocks 602-608, if any, to determine a travel path plan for the agricultural machine 100 at block 610 that can be utilized by the guidance system 434 in directing the movement of the agricultural machine 100 through the field. For example, in the event a historical traffic or travel map is available having locations of prior track paths 175a-d, the path planner 438, 466 can, knowing the properties agricultural machine 100, provide a path for agricultural machine 100 wherein at least one engagement body 102a-d of the agricultural machine 100 travels along a prior, or existing, track path 175a-d, if any, that may be identified via the traffic or travel map. Further, as previously discussed, knowing the properties of the agricultural machine 100, the path planner 438, 466 can attempt to identify whether track paths 175a-d align with each of the engagement bodies 102a-d of the agricultural machine 100, or vice versa. In the event that each of the engagement bodies 102a-d cannot simultaneously travel along existing track paths 175a-d, then the path planner 438, 466 can determine which engagement bodies 102a-d are to travel along an existing track path(s) 175a-d. For example, according to certain embodiments, the path planner 438, 466 can identify, using agricultural machine 100 properties from block 608, the engagement body(ies) 102a-d of the agricultural machine 100 that may exert the largest downward force or load on the field, and thus which engagement body 102a-d may have the largest potential for adversely impacting soil compaction. Based on such a determination, the path planner 438, 466 can select the engagement body(ies) 102a-d that is to travel along an existing track path 175a-d in the field. Alternatively, or additionally, using the properties of the agricultural machine 100, such as, for example, the locations of each of the engagement bodies 102a-d, the path planner 438, 466 can select a path of travel for the agricultural machine 100 in which as many engagement bodies 102a-d as possible align with and/or at least partially overlap, existing track paths 175a-d. Such an embodiment can attempt to minimize soil compaction by maximizing the number, or degree, of engagement bodies 102a-d that travel along track paths 175a-d while moving across the field.

Additionally, at block 610, the path planner 438, 466 can utilize the conditions and properties of the agricultural field from block 604 to further determine at least an order or sequence in which the agricultural machine 100 travels along the track paths 175a-d in the field. For example, information regarding sensed moisture content of areas within the field, the composition of the soil in the field, and/or locations of relatively high and low areas in the field can provide an indication to the path planner 438, 538 of areas in the field that may be drier, or might dry sooner, than other areas in the field. Using such information, the path planner 438, 466 can determine a travel path for the agricultural machine 100 in which the agricultural machine 100 is to travel along track paths 175a-d in areas in the field that are drier, or expected to dry sooner, than other areas that may have a higher moisture content and/or are anticipated to dry slower. Again, the extent and/or degree to which the path planner 434, 466 can anticipate different areas drying relative to other areas in the field can be based on a variety of criteria, including, for example, soil content, relative height of the area, and/or current moisture content, among other considerations. Thus, for example, referencing FIG. 7, given the relatively higher locations of the areas around the outer sides 702a, 702b, of the field 700 relative to the center region 704, and the associated anticipated drier soil conditions along those outer sides 702a, 702b, the path planner 438, 466 can select a travel path for the agricultural machine 100 in which the agricultural machine 100 travels along a first outer subset 710a of track paths 175a-d and along a second outer subset of track paths 175a-d before traveling long an inner subset 710c of track paths 175a-d that are in the vicinity of the center region 704 of the field. By the path planner 438, 466 basing the travel path of the agricultural machine 100 at least in part on the actual or anticipated moisture content of the soil, the path planner 438, 466 may be able to at least partially minimize the adverse impact on soil compaction that may be associated with movement of the agricultural machine 100 in the field. Additionally, such an impact on soil compaction in the field by the travel of the agricultural machine 100 can also be minimized by the path planner 438, 466 timing the areas in which the agricultural machine 100 travels so as to at least attempt to delay the agricultural machine 100 from reaching wetter areas until after the agricultural machine 100 travels along other areas in the field, thereby affording the soil in the wetter areas additional time to dry and/or additional time to experience a reduction in moisture content.

The guidance system 434 can utilize the travel path determined by the path planner 438, 466 in connection with guiding the movement of the agricultural machine 100 as the agricultural machine 100 performs an agricultural operation at block 612. A variety of different types of agricultural operations can be performed at block 612, including an operating involving planting, spraying, cutting, or harvesting crop, among other agricultural operations.

As the agricultural machine 100 is performing an agricultural operation in the field at block 612, the actual travel path taken by the agricultural machine 100 can be recorded at block 614 by the control system 400 and/or the central system 450. For example, location information obtained by the location system 408 as the agricultural machine 100 travels across the field can be recorded and stored in a memory of the control system 400, including, for example, by the memory device 406 and/or map system 450. As previously discussed, information regarding the location of the agricultural machine 100 can be used, such as, for example, by the map system 450, to determine at block 616 the locations at which the engagement bodies 102a-d are actually traveling, or have traveled, along the field, and thus determine the locations of the associated track paths 175a-d for those engagement bodies 102a-d (FIG. 9A) in the field. For example, FIG. 9A illustrates an agricultural machine 100 in the form of a windrower 100' that is cutting crop and depositing an associated windrow 144 in the field. As seen by broken format lines, the track paths 175a-d at which the engagement bodies 102a-b had traveled along the field can be determined by the mapping system 450 and recorded for at least use in updating the traffic or travel map. Again, the track paths 175a-d can be determined by the mapping system 450 in a variety of different manners, including, for example, be based on the locations of the engagement bodies 120a-d relative to the receiver 154 of the location system 408 or other components of the location system 408 to which the identified location of the agricultural machine 100 is based.

At block 618, the location at which the first agricultural machine 100 deposits crop material, such as, for example, in the form of the windrow 144, can be determined. For example, as previously discussed, the location of the deposited crop material/windrow 144 can be determined using information obtained by the rear sensor 416, as well as correlating such information to the location information obtained by the location system 408. As also seen in FIG. 9A and discussed below in more detail, in the illustrated example, performance of the agricultural operation can include depositing the crop material, in this example the windrow 144, to not only from a particular windrow pattern 115, but also at a particular location relative to the agricultural machine 100, which may be beneficial with respect to at least soil compaction during a subsequent agricultural operation that may be performed by another agricultural machine 200.

At block 620, the agricultural operation being performed by the first agricultural machine 100 in the identified field may be completed. According to certain embodiments, upon completion of the agricultural operation, information regarding the track paths 175a-d associated with the engagement bodies 102a-d of the agricultural machine 100 can be communicated via the communication units 428, 454 to the central system 450. Alternatively, or additionally, the track paths 175a-d associated with the engagement bodies 102a-d can be generally continuously communicated, communicated at regular intervals, and/or communicated upon an occurrence of a triggering event to the mapping system 458 of the central system 450. The mapping system 458 of the central system 450 can utilize such information in connection with updating the traffic or travel map that is stored by the central system 450, including, for example, stored in the database 452.

In connection with the second agricultural machine 200 performing an agricultural operation in the field after the first agricultural operation, at block 622, using the communication units 454, 528, the map system 505 and/or path planner 538 of the control system 500 of the second agricultural machine 200 can retrieve the travel or travel map from the central system 450. Such information obtained at step 622 can also include the geometrical information regarding at least the positioning of the engagement bodies 102a-d, 206a-d, 208a-d of the first and/or second agricultural machines 100, 200 and/or information regarding the types of first and second agricultural machines 100, 200, including, for example, whether the machines 100, 200 are, or include, a tractor or implement, and/or based on the type of agricultural operation performed by the agricultural machine 100, 200. The timing at which the second agricultural machine 200 performs the second agricultural operation may, or may not, be directly subsequent to the performance first agricultural operation. For example, according to certain embodiments, other agricultural operations that may be similar to, or different than, the first agricultural operation that was performed by the first agricultural machine 100 can occur before the second agricultural operation is performed by the second agricultural machine 200.

Similar to blocks 604 and 610, at block 624 field conditions and/or properties can be determined and/or updated for use by the path planner 466, 538 of the second agricultural machine 200 and/or of the central system 450. For example, according to certain situations, the duration of time between the first agricultural operation and a second agricultural operations and/or associated changes in the ambient environment and/or temperatures may warrant a revaluation of at least the conditions of the field, including, but not limited to, current soil or crop moisture contents in areas within the field. In some examples, condition information may come from remote sensors such as unmanned aerial vehicle 706 or from in situ sensors such as soil moisture sensor 708. Additionally, the crop properties at block 624 can also reflect information obtained by the sensor system 412 of the first agricultural machine 100, including, for example, information regarding crop moisture that may have been obtained by the constituent sensor 422 and/or moisture sensor 424.

At block 626, certain properties of the second agricultural machine 200, including, for example, the locations of the associated engagement bodies 206a-d, 208a-d and/or the loads being transmitted to the ground surface 104 through each of the engagement bodies 206a-d, 208a-d can be evaluated. Such an evaluation and associated determinations can be similar to the evaluations and determinations discussed above with respect to at least blocks 608 and/or 610. Additionally, at block 626, a determination can be made as to whether the engagement bodies 206a-d, 208a-d of the second agricultural machine 200 and/or the agricultural vehicle 202 each can align with a corresponding and pre-existing track path 175a-d, as indicated by the retrieved travel map, such that each engagement body 206a-d, 208a-d of the second agricultural machine 200 can travel along a preexisting track path 175a-d as the second agricultural machine 200 performs the second agricultural operation. Additionally, or alternatively, the determination at block 626 can at least involve, for example, a determination that a base of the engagement bodies 102a-d, such as, for example, a wheel base of the first agricultural machine 100, is the same as the base of the engagement bodies 206a-d, 208a-d of the second agricultural machine 200 and/or agricultural vehicle 202 of the second agricultural machine 200, or vice versa.

If a determination is made at block 626 that the engagement bodies 206a-d, 208a-d of the second agricultural machine 200 and/or the agricultural vehicle 202 each can align with an existing track path 175a-d, and thus each engagement body 206a-d, 208a-d of the second agricultural machine 200 and/or the agricultural vehicle 202 can travel along an existing track path 175a-d, then at block 628 the path planner 538 can determine a travel path for the second agricultural machine 200 in a manner that is at least similar to the determination of the travel path made for the first agricultural machine 100, as discussed above with respect to at least block 610.

Conversely, if the determination is made at block 626 that each engagement body 206a-d, 208a-d of the second agricultural machine 200 and/or the agricultural vehicle 202 cannot pass along an existing track path 175a-d, then at block 630 the path planner 538 can select which one or more engagement bodies 206a-d, 208a-d are to be positioned to travel along one of the existing track paths 175a-d. Such a determination can be based on a variety of criteria, including, for example, a selection of an engagement body 206a-d, 208a-d or combination of engagement bodies 206a-d, 208a-d, that may minimize the overall impact of soil compaction that is associated with one or more other engagement bodies 206a-d, 208a-d not traveling on a track path 175a-d. Thus, for example, the selection of the engagement body(ies) 206a-d, 208a-d that are to travel on a track path 175a-d can be based on selecting the engagement body 206a-d, 208a-d that exerts that largest load on the adjacent ground surface 104, the proximity engagement bodies 206a-d, 208a-d that are not traveling on a track path 175a-d, will be to an adjacent track path 175a-d, and/or the extent at least a portion of other, non-selected engagement bodies 206a-d, 208a-d may or may not also be on a track path 175a-d, among other considerations.

A determination at block 626 by the path planner 538 that at least some of the engagement bodies 206a-d, 208a-d of the second agricultural machine 200 will not be aligned with a track path 175a-d can also provide an indication for the path planner 438, 466, 538 of the first and/or second agricultural machine(s) 100, 200 and/or of the central system 450 that, at least in the future, the first agricultural operation performed by the first agricultural machine 100 may need to be adjusted. Such adjustment in the performance of the first agricultural machine 100 may be directed to ensuring that the quality and/or efficiency in the performance of the subsequent second agricultural operation by the second agricultural machine 200 is maintained, if not enhanced, when the engagement bodies 206a-d, 208a-d of the second agricultural machine 200 are positioned to the travel along some, but not all, of the track paths 175a-d of the first agricultural machine 100.

For example, during operation of the first agricultural machine 100 at a first time period, the first agricultural machine 100 can deposit a first windrow 144 on the field. However, the first windrow 144 may be deposited at a location that, when the centerline 228 of the second agricultural machine 200 and/or pick-up mechanism 214 is generally aligned with a centerline 117 of the first windrow 144, only a few of the engagement bodies 206a-d, 208a-d of the second agricultural machine 200 will travel along track paths 175a-d, or on a portion of track path 175a-b, as the second agricultural machine 200 performs an agricultural operation using the first windrow 144. Using information from the operation of the second agricultural machine 200 using the first windrow 144, in at least an effort to improve the extent and/or number of engagement bodies 206a-d, 208a-d of the second agricultural machine 200 will travel along a track paths 175a-d during future operations, an adjustment(s) can be made to an operation(s) of the first agricultural machine 100. For example, for subsequent operations of the first agricultural machine 100, the operation of the diverter 140 of the first agricultural machine 100 can be adjusted so that a later, or second, windrow is deposited at a location in the field relative to at least the first agricultural machine 100 that is different than the location at which the first windrow 144 had been deposited relative to the first agricultural machine 100. For example, a centerline of the second, later deposited windrow can be offset from the centerline 117 of the previously, or first, deposited windrow 144. Such a change in the operation of the diverter 140 may allow more of the engagement bodies 206a-d, 208a-d of the second agricultural machine 200 to travel along track paths 175a-d, or along a larger portion of the track paths 175a-d, during future operations, such as during a later operation involving the subsequently deposited second windrow.

For example, as discussed above, FIG. 9A depicts an exemplary illustration of a first agricultural machine 100 in the form of a windrower 100' cutting a crop 158 in a field, and depositing the cut crop material in a windrow 144. As also seen in FIG. 9A, the first agricultural machine 100 has a centerline 162 that extends from a front end to a rear end of the agricultural machine 100. Further, as previously discussed, the locations at which each engagement body 102a-d of the first agricultural machine 100 traveled along the field provide track paths 175a-d that can be recorded by the map system 450, 458. FIG. 9B illustrates a second agricultural machine 200 in the form of a baler 200'. As seen in FIG. 9B, the baler 200' performs a second agricultural operation in which the baler 200' collects the crop material from the windrow 144 and, from the collected crop material, forms and outputs a crop bale 212. In this example, a determination was made at block 626 by the path planner 466, 538 that each of the engagement bodies 206a-d, 208a-d of the second agricultural machine 200/baler 200' would not simultaneously align with a track path 175a-d. Thus, in this example, as illustrated by FIG. 9B, the path planner 466, 538 determined at block 630 that the second agricultural machine 200, 200' would be positioned to travel along a path at which a fourth, rear engagement body 206d of the agricultural vehicle 202 is to travel along a track path 175d that had been previously traveled on, and/or created by, a fourth engagement body 102d of the first agricultural machine 100/windrower 100', Thus, the other engagement bodies 206a-c, 208a-d of the second agricultural machine 200, 200' will not travel along an existing track path 175a-d, and/or are, or will be, only partially on, or overlap an existing track path 175a-d. However, as indicated by FIG. 9B, positioning the second agricultural machine 200, 200' at such a location results in the center of the second agricultural machine 200, 200' (as indicated by the centerline 228 of the second agricultural machine 200, 200') traveling along a path that is offset from the path taken by the first agricultural machine 100, 100', as indicated by illustrated the centerline 162 of the first agricultural machine 100, 100'. Thus, had the first agricultural machine 100, 100' deposited the windrow 144 along a location that aligned with the centerline 162 of the first agricultural machine 100, 100' the windrow 144 would have been off center relative to the second agricultural machine 200, 200' as the second agricultural machine 200, 200' traveled on at least the one preexisting track path 175d. Such an offset between the windrow 144 of the second agricultural machine 200 may result in one side of the pick-up mechanism 214 collecting more crop from the windrow 144 than another side of the pick-up mechanism 214, which could lead to uneven distribution of collected crop when forming the crop bale 212. As a consequence, the subsequently formed crop bale 212 may have an uneven consistency and/or a non-uniform shape, as well as result in inconsistencies between the bales 212 formed by the second agricultural machine 200.

Thus, in the illustrated example, the offset location of the path of travel of the second agricultural machine 200 relative to path of travel the first agricultural machine 100 can be evaluated at least at block 632 by the path planner 438, 466, 538, or other portions of the controller 402, 460, 502. Such an evaluation can include evaluating a windrow map that may be generated by the pattern generator 418. Moreover, such evaluation by the path planner 438, 466, 538, or other portions of the controller 402, 460, 502, can be performed in connection with determining whether any adjustments or accommodations are to be made in the performance of the first agricultural operation by the first agricultural machine 100 so as to benefit, or not adversely impact, the performance of the second agricultural operation by the second agricultural machine 200. For example, as seen in FIG. 9A, according to certain embodiments, such an accommodation can include operating the diverter 140 of the illustrated windrower 100' so that the windrow 144 is deposited about a windrow centerline 117 that is offset from the centerline 162 of the first agricultural machine 100, and is instead generally aligned with the centerline 228, or generally at or around the centerline 228, also referred to herein as a center portion, of the second agricultural machine 200 and/or a similar centerline of at least the pick-up mechanism 214. Further, as discussed above, the diverter 140 of the second agricultural machine 200 can be operated so that the windrow 144 formed by the windrower 100' has a non-linear windrow pattern 115 that can further assist in generally uniform collection of the windrow 144 by the windrower 100' as the windrower 100' travels on a least one track path 175d. Moreover, such a non-linear windrow pattern 115, as well as depositing the windrow 144 at a location that will be generally align with the centerline 228 of the second agri-cultural machine 200/baler 200' and/or pick-up mechanism 214 can accommodate generally uniform collection of the crop material from the windrow 144 without oscillating the second agricultural machine 200/baler 200' about, or deviating the second agricultural machine 200/baler 200' from the aligned track path 175d, thereby further minimizing the area in which the second agricultural machine 200/baler 200' may cause soil compaction.

The determinations made at block 632 with respect to potential changes or accommodations made in the performance of the first agricultural operation by the first agricultural machine 100 for the benefit of the performance and/or efficiency of the second agricultural operation by the second agricultural machine 200 can occur at a variety of times. For example, according to certain embodiments, such a determination can be made by the path planner 438, 466, 538 or other component of the control system 400, 500 and/or central system 450 before the performance of the first agricultural operation. Additionally, or alternatively, such determination, as well as adjustments to such determinations, can be made by the path planner 438, 466, 538, or other component of the control system 400, 500 and/or central system 450 after the performance of the first agricultural operation and before, or during, the performance of the second agricultural operation. Further, information from block 632 can be utilized by the pattern generator 418 in generating the windrow pattern 115 for the windrow 144, as discussed below with respect to FIG. 8.

Having a travel path determined by the path planner 466, 530 at blocks 628 or 632, at block 634 the second agricultural machine 200 can perform the second agricultural operation. Similar to blocks 614 and 616 and the track paths 175a-d illustrated with respect to the first agricultural machine 100, the map planner 466, 538 or other components of the control system 500 of the second agricultural machine 200 and/or of the central system 450 can record the actual travel path taken by the second agricultural machine 200 and determine the locations of the associated track paths of the engagement bodies 206a-d, 208a-d of the second agricultural machine 200 at blocks 636 and 638, respectively. Additionally, at block 640, to the extent not already recorded, the track paths from the second agricultural machine 200 can be recorded by the map system 458, 550, and the traffic or travel map can be updated. While the updated traffic or travel map can be stored at a variety of locations, according to certain embodiments, the updated traffic or travel map can be stored in a database 452 of the central system 450, as previously discussed.

Figure 8:
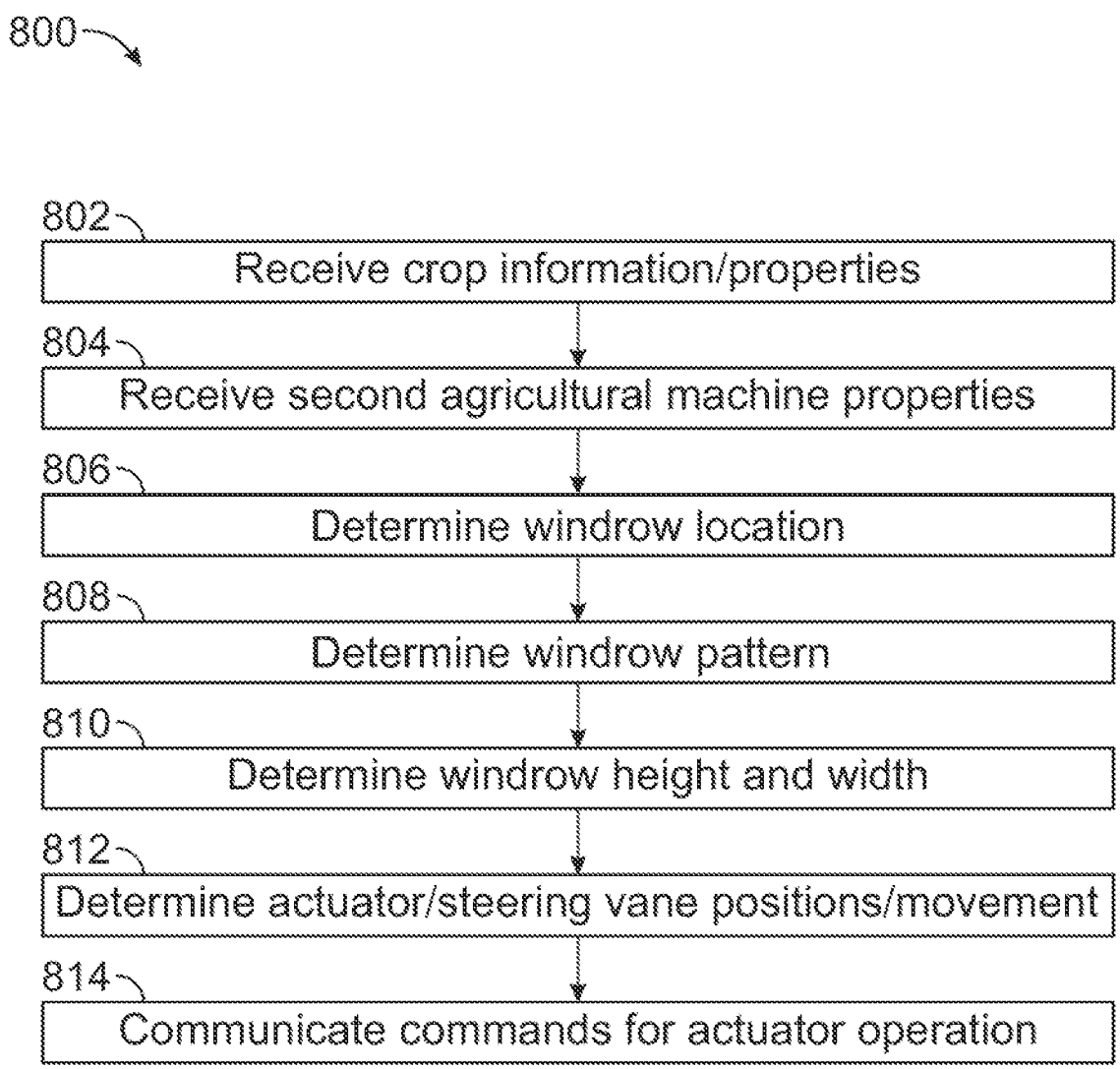
FIG. 8 is a simplified flowchart of a method that can be performed by a pattern generator in connection with determining a location and shape characteristics for a windrow.

Referring now to FIG. 8, an illustrative method 800 is provided for the path planner 438 to generate a windrow map and/or a control map for operation of the diverter 140 in connection with an agricultural machine 100 depositing crop material in the field in the form of a windrow 144 having a non-linear windrow pattern 115. The method 800 corresponds to, or is otherwise associated with, performance of the blocks described below in the illustrative sequence of FIG. 8. It should be appreciated, however, that the method 800 may be performed in one or more sequences different from the illustrative sequence.

At block 802, the pattern generator 418 can receive information regarding crop properties, including, but not limited to, information regarding moisture content. Thus, for example according to certain embodiments, the pattern generator 418 can receive information from the sensor system 412 that indicates properties or characteristics of the crop that is being cut by the agricultural machine 100. According to certain embodiments, the crop properties can be collected a priori or in situ to performance of the agricultural operation or prior agricultural operations.

At block 804, the pattern generator 418 can receive or retrieve information regarding the second agricultural machine 200 that will be collecting the crop material from the windrow 144. As discussed above with respect to at least block 632 of FIG. 6, such information can assist in at least the pattern generator 418 determining at block 806 a location for a depositing the windrow 144 in the field. For example, physical properties of the second agricultural machine 200, such as a width of the second agricultural machine 200 and/pickup mechanism 214, as well as the travel path that the first agricultural machine 100, 100' and/or second agricultural machine 200, 200' will take while traveling in the field, as determined for example, by the path planners 436, 466, 536 at blocks 610 and 628 or 630, respectively, and as previously discussed with respect to FIGS. 9A and 9B, can assist the pattern generator 418 in determining the location in the field at which the windrow 144 and/or windrow centerline 117 is/are to be positioned. Moreover, according to certain embodiments, the pattern generator 418 can determine the location at which the windrow centerline 117 is expected to be generally be aligned with the centerline 228 of the second agricultural machine 200 and/or the associated pick-up mechanism 214 as the second agricultural machine 200 travels along the field.

Additionally, as seen in FIG. 9A, information regarding the physical sizes of the second agricultural machine 200 can assist the pattern generator 418 at block 808 with determining a windrow pattern 115, including, for example, an overall width ($w_1$) of the windrow 144. The overall pattern width ($w_1$) of the non-linear windrow pattern 115, such as, for example, the width between opposing peaks 119 in the windrow pattern 115, can be based on a variety of different criteria, including, for example, the width the pick-up mechanism 214 of the second agricultural machine 200 that will be collected the crop material of the windrow 144. For example, using the physical sizes of the second agricultural machine 200, the pattern generator 418 can determine an overall width ($w_1$) of a windrow pattern 115 in which the windrow 144 oscillates between peaks 119 on opposing sides of the windrow centerline 117 so that the windrow 144 will have an overall width ($w_1$) that will be similar, but slightly smaller, than the effective width of the pick-up mechanism 214, and moreover, the length across at least the portion of the pick-up mechanism 214 that can collection crop material from the windrow 144. While the foregoing provides a particular example, the non-linear shape of the windrow 144 can take a variety of forms. For example, according to certain embodiments, the shape of the windrow 114 can be formed via the diverter 140 being operated in a manner that forms the windrow 114 with non-constant deviation from the centerline 162 of the first agricultural machine 100 in a direction of travel of the first agricultural machine 100. Additionally, or alternatively, the windrow 144 can comprise a collection of curvature and/or straight segments in a direction parallel to a direction of travel of the first agricultural machine 100.

By configuring the windrow pattern 115 with an overall width ($w_1$) that is similar to the input width of the pick-up mechanism 214, the pattern generator 418 can assist in providing for a relatively uniform collection of crop material by the second agricultural machine 200, 200' from the windrow 144 while at least one or more engagement bodies 206a-d, 208a-d of the second agricultural machine 200 remain traveling along a preexisting track path 175a-d, thereby at least attempting to continue to minimize the size of area in the field that may be subjected to soil compaction by the travel of the second agricultural machine 200. Moreover, the selected overall width ($w_1$) of the windrow 144 may promote relatively uniform collection of the crop material from the windrow 144 without the second agricultural machine 200 moving in an oscillating pattern along the field, thereby reducing the potential size of the area in the field that may be subjected to soil compaction by the second agricultural machine 200.

In developing the windrow pattern 115, the pattern generator 418 can also consider information regarding the characteristics and properties of the agricultural machine 100, 100' that will be depositing the crop material to from the windrow 144, including, for example, properties related to the associated diverter 140. For example, among other fixed and kinematic data relating to the equipment of the first agricultural machine 100, 100' the pattern generator 418 can consider the range of movement, and/or speed of movement, of the actuators 148a-f and/or the associated steering vanes 142a-f. The pattern generator 418 can also consider factors regarding the speed or force at which the agricultural machine 100 can impart onto the crop material that is being passed through the diverter 140, and thus the distance that the crop material may travel from the agricultural machine 100 when forming the windrow 144. Additionally, the pattern generator 418 can determine speeds at which the agricultural machine 100 is to travel, and thus instructions for the propulsion system 436, in connection with at least depositing the crop material to form a desired windrow pattern 115. The pattern generator 418 can also consider the shape of the pattern relative to forecasted and/or historic wind speeds to manage drying of the crop material.

At block 810, the pattern generator 418 can determine a width (generally indicated by "W 2" in FIG. 9A, and a height from the ground, for the windrow 144. Such determinations can be based, at least in part, on the crop information received at block 802, including, for example, information regarding the moisture content of the cut crop material. Moreover, such determinations can be based at least in part on determining drying rates for the crop material that will be in the windrow 144, including under current or anticipated ambient conditions, as well as possible wind, temperature, and/or precipitation levels in the associated field.

The determinations made at blocks 806, 808, and 810 can be utilized by the pattern generator 418 and/or controller 402 at block 812 in determining commands or instructions for the actuators 148a-f of the diverter 140. Such commands at block 614 can relate to the actuators 148a-f being operated, such as, for example, retracted, extended, or maintained at a particular position, as well as the timing of the such operations, so that the associated steering vanes 142a-f are positioned, moved, and/or oriented in a manner that can attain a particular selected windrow pattern 115, height, and width at the determined location for the windrow 144.

Moreover, the pattern generator 418 can determine commands, which can be issued to the actuators 148a-f by the pattern generator 418 and/or controller 402, for oscillating the actuators 148a-f of the diverter 140 such that one or more of the associated steering vanes 142a-f are moved to deflect crop material in a manner that can form a non-linear shaped windrow pattern 115 or configuration along a windrow centerline 117 at the location in the field that was determined at block 804. For example, as seen in FIGS. 9A and 9B, the pattern generator 418 can issue instructions or commands for operation of at least the actuators 148e, 148f associated with the right and left side steering vanes 142e, 142f between extended and retracted positions such that the steering vanes 142a-f are positioned, and/or are oscillated, to direct or deflect crop material from the diverter 140 in directions that will form the non-linear windrow pattern 115. According to certain embodiments, the pattern generator 418 can generate a control map for operation of the diverter 140, and moreover, the actuators 148a-f. Alternatively, according to other embodiments, the pattern generator 418 can issue commands or instructions for operation of the diverter 140/actuators 148a-f in the form of real time control signals.

Figure 10:
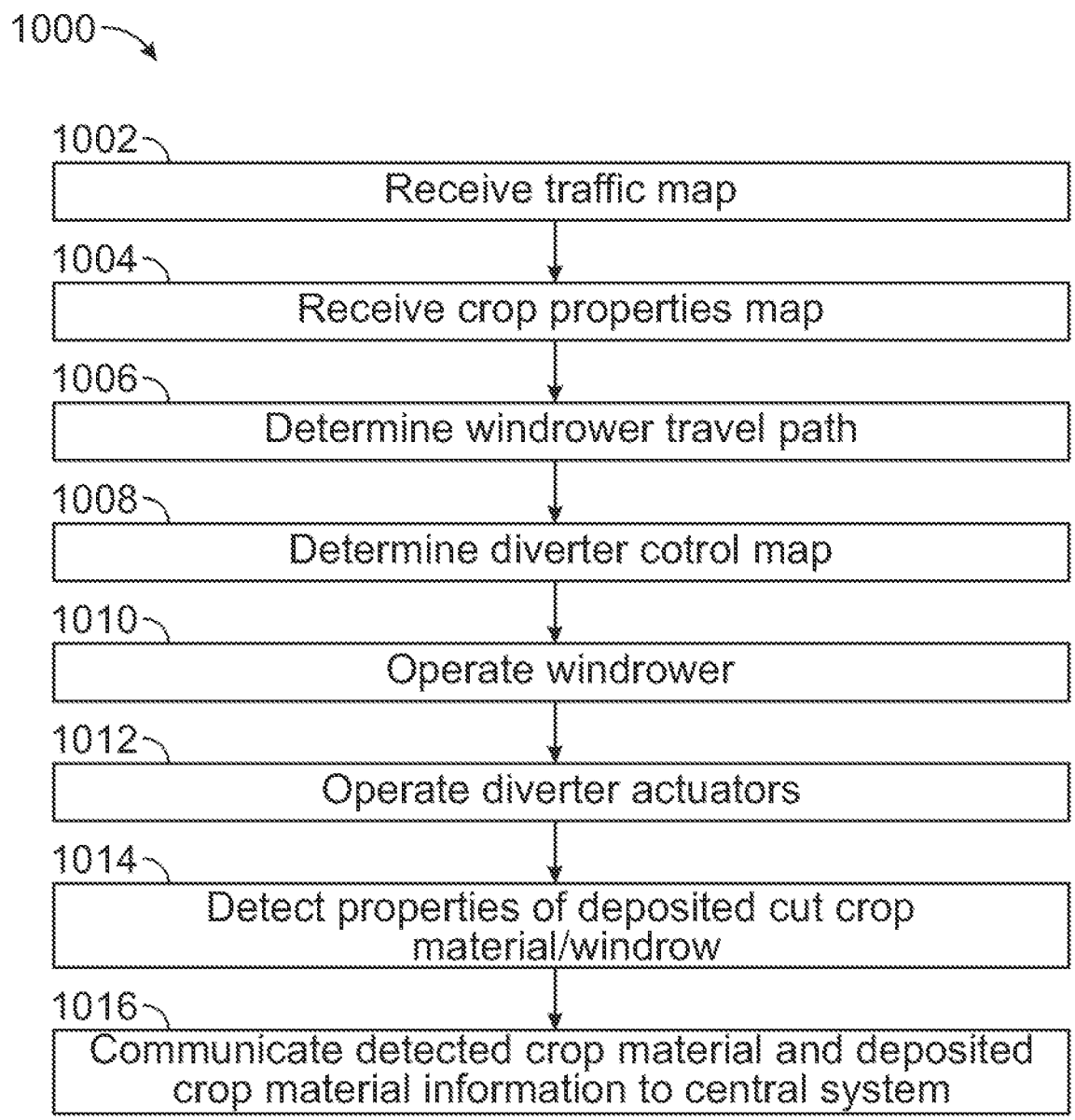
FIG. 10 is a simplified flowchart of a method that can be performed by a control system of a windrower, including a path planner and pattern generator, in guiding the movement of the windrower along a travel path and forming a windrow.

FIG. 10 provides an illustrative method 1000 for operating a first agricultural machine 100, such as, for example, a windrower 100', to form a windrow 144 having a non-linear windrow pattern 115. The method 1000 corresponds to, or is otherwise associated with, performance of the blocks described below in the illustrative sequence of FIG. 10. It should be appreciated, however, that the method 1000 may be performed in one or more sequences different from the illustrative sequence.

At block 1002, the control system 400 of the first agricultural machine 100/windrower 100', including, for example, the path planner 418, can retrieve an existing traffic or travel map, if any. For example, according to certain embodiments, the control system 400 can receive an existing traffic or travel map that was stored in a database 452 of the central system 450 via communications between the associated communication units 428, 454. Additionally, according to certain embodiments, the path planner 418, 466 can also receive, at block 1004, a crop properties map, which can include, information regarding the crops upon which the windrower 100' will be performing an agricultural operation, such as, for example, a cutting operation, among other operations. The crop properties map can include a variety of information regarding various properties of the crop upon which the agricultural operation will be performed, including, but not limited to, moisture content, biomass content, and/or crop compositions or levels of compositions, among other properties.

At block 1006, the travel path for the first agricultural machine 100, 100' can be determined. Such a travel path can be determined in manner similar to one or more of the travel paths discussed above with respect to at least blocks 610, 628, or 630 in FIG. 6. Additionally, at block 1008, the pattern generator 418 can determine a windrow map and/or diverter control map. According to certain embodiments, the windrow map and/or diverter control map can be generated by the pattern generator 418 in a manner that is at least similar to the method 800 discussed above with respect to FIG. 8. Using at least the travel path determined at block 1006, the guidance system 434 can direct, via control of the steering controller 432, the movement and/or travel of the first agricultural machine 100, 100' as the first agricultural machine 100, 100' is operated to perform the agricultural operation, which, again, in this example, is to cut crop plants and form an associated windrow 144. Such guidance of the agricultural machine 100, 100' can also include controlling the propulsion system 436, and moreover the speed at which the agricultural machine 100, 100' travels, which can also impact the shape and/or size of the windrow 144. Similarly, using the windrow map and/or diverter control map generated by the pattern generator 418, the pattern generator 418 or other components of the control system 400 can generate commands or instructions such that, at block 1012, the diverter 140, and moreover, the actuators 148a-f of the diverter 140, are operated in a manner that is to form the non-linear shaped windrow 144, as determined by the pattern generator 418.

Optionally, according to certain embodiments, at block 1014, the sensor system 412 of the agricultural machine 100 can be utilized to detect information regarding the actual configuration and/or pattern of the windrow 144 deposited on the field that can provide a windrow map the windrow map can be generated by the control system 400 and/or the map system 450, and can indicate the location and shape/size of the windrow 144, as well as properties of the crop material within the windrow 144. Thus, for example, as crop material passes through, and/or exits, the agricultural machine 100, one or more sensors of the sensor system 412, such as, for example, the constituent sensor 422, biomass sensor 420, and/or moisture sensor 424, can sense one or more properties of the cut crop material. The location of the deposited crop material on the field and/or along the windrow 144 can be detected by the sensor system 412, such as, for example, via one or more images obtained by a rear sensor 416, such as a camera 160 (FIG. 1). As previously discussed, information from such images can be correlated to a location using, at least in part, location information obtained by the location system 408 of the agricultural machine 100. Additionally, the windrow map generated at block 1014 can, at block 1016, be communicated via the communication units 428, 454 to the central system 450, and stored in the database 452.

Figure 11:
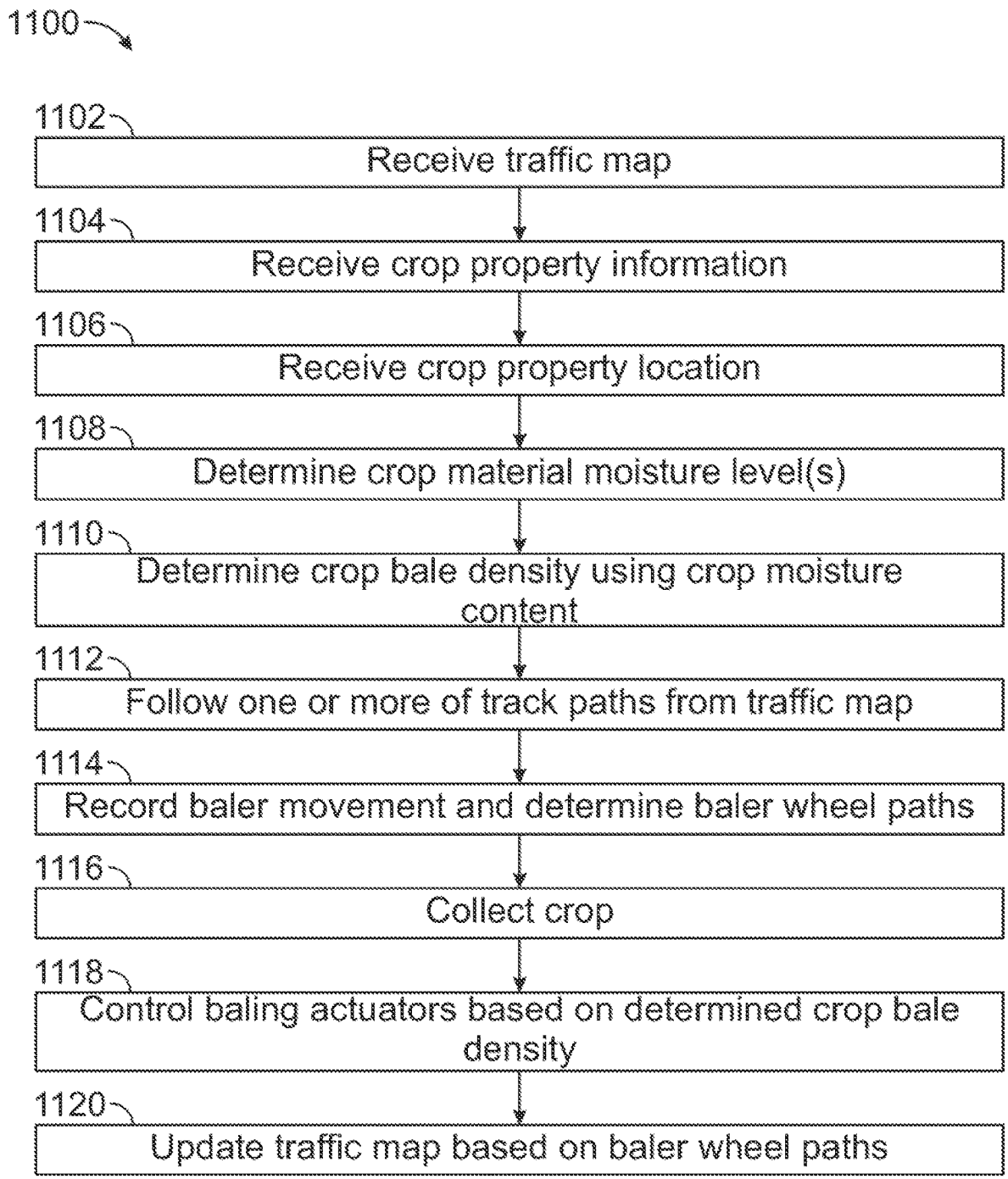
FIG. 11 is a simplified flowchart of a method that can be performed by a control system of a baler, including a path planner, in guiding the movement of the baler along a travel path and forming crop bales having densities that are based at least in part on a detected crop moisture.

FIG. 11 provides an illustrative method 1100 for operating a second agricultural machine 200, such as, for example, a baler 200', to collect and bale crop material from a windrow 144. The method 1100 corresponds to, or is otherwise associated with, performance of the blocks described below in the illustrative sequence of FIG. 11. It should be appreciated, however, that the method 1100 may be performed in one or more sequences different from the illustrative sequence.

At block 1102, the control system 500 of the second agricultural machine 200, 200', including, for example, the path planner 538, can retrieve an existing traffic or travel map, if any. For example, according to certain embodiments, the control system 500 can receive an existing traffic or travel map that was stored in a database 452 of the central system 450 via communications between the associated communication units 454, 528. Additionally, according to certain embodiments, the path planner 538 can also receive at block 1104 a crop properties map, which can include information regarding the properties of crop materials upon which the second agricultural machine 200, 200' will be performing an agricultural operation, such as, for example, collecting cut crop and forming crop bales 212, among other operations. The crop properties map can include a variety of information regarding various properties of the crop material, including, but not limited to, moisture content, biomass content, and/or crop compositions or levels of compositions, among other properties. According to certain embodiments, information regarding crop properties can be provided, at least in part, by the windrow map that was created at block 1014, and stored by, the central system 450 at block 1016, of the method 1000 discussed above with respect to the FIG. 10. Additionally, according to certain embodiments, the windrow map provided to the path planner 538 of the second agricultural machine 200, 200' can include biomass information regarding the crop material in the windrow 144, including, for example, biomass information obtained via the biomass sensor 428. According to embodiments, the second agricultural machine 200, 200' may use such biomass information to control the feed rates at which collected cut crop material is feed into the baling/compression chamber system 218.

At block 1106, the location of the crop material on which the second agricultural machine 200, 200' is to perform the agricultural operation can be retrieved, such as, for example, by the path planner 538. For example, according to certain embodiments, the crop material location can be a location of the windrow 144, as planned in connection with the windrow map that may be generated at block 1008, or as detected at block 1014 and stored by the central system 450 at block 1016 of the method 1000 discussed above with respect to the FIG. 10.

Using information regarding the crop properties that were attained at block 1104, the control system 500, including, for example, the path planner 538, can determine a moisture content of the crop material of the windrow 144 at block 1108. The level of moisture content can be compared to one or more thresholds levels, or ranges of levels, in connection with determining the amount of crop material that is to be included in a later formed, and associated crop bale 212. Moreover, the density the crop bale 212 is to have can be determined based on the detected moisture content of the crop material. By controlling the density of the crop bale 212, the method 1100 can form crop bales 212 with density levels that can accommodate further drying, if needed, of the crop bale 212, and/or prevent damage to the crop bale 212 that could otherwise be attributed to too high of a density of relatively wet crop material being bound together in the bale 212.

At block 1110, the second agricultural machine 200, 200' can travel in the field along a determined travel path. The travel path along which the second agricultural machine 200, 200' travels can be determined in manner similar discussed above with respect to at least blocks 610, 628, or 630 of the method 600 depicted in FIG. 6. Additionally, such movement of the second agricultural machine 200, 200' can be recoded, and the associated location of the track paths 175a-d of the second agricultural machine 200, 200' can be determined at block 1112 by the map system 538 in a manner that is at least similar to the features discussed above with respect to blocks 614, 616, 636, and/or 638 in FIG. 6. Additionally, as the second agricultural machine 200, 200' travels along the field, the second agricultural machine 200, 200' can collect crop material at block 1114, which can be baled at block 1116. Further, at block 1116, the actuators or other compression devices of the baling/compression chamber system 218 can be operated in a manner that at least attempts to attain crop bales 212 that have densities that correspond to the crop densities that were determined at block 1108. Additionally, or optionally, the crop properties from block 1104 can provide an indication as to whether the dosing system 526 should be operated, and, if so, an indication of a dosing rate.

At block 1118, while performing, or after completion, of the agricultural operation, the recorded or detected movement of the second agricultural machine 200, 200', and/or the determined location of the associated track paths of the second agricultural machine 200, 200' can be communicated via the communication units 454, 530 to the central system 450. Such information can then be used to update the traffic or travel map at the central system 450, which can be stored in the database 452. Alternatively, at block 1118, an updated traffic or travel map from the map system 550 of the baler 200' can be communicated to, and stored in, the database 452 of the central system 450. Such an updated traffic or travel map can then become available for other agricultural machines and/or in connection with subsequent performance of agricultural operations in the field.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A method comprising:
receiving information indicating, for a first plurality of engagement bodies of a first agricultural machine, a first plurality of track paths, each track path of the first plurality of track paths corresponding to a location at which at least one of the first plurality of engagement bodies engaged a ground surface of a field;
determining, for a second agricultural machine, a travel path at which one or more of a second plurality of engagement bodies of the second agricultural machine travel on at least a portion of one or more of the first plurality of track paths as the second agricultural machine performs an agricultural operation;
determining a location of a centerline of the second agricultural machine along the travel path, the centerline of the second agricultural along the travel path being offset from a centerline of the first agricultural vehicle along the first plurality of track paths; and
adjusting, in response to determining the location of the centerline of the second agricultural machine, a diverter of the first agricultural machine to deposit a windrow from the first agricultural machine at a location at which a centerline of the windrow will be aligned with the centerline of the second agricultural machine as the second agricultural machine travels along the travel path,
wherein the windrow is a second windrow, and wherein adjusting the diverter occurs subsequent to determining a location of a windrow centerline of a first windrow deposited by the first agricultural machine is offset from the centerline of the second agricultural machine.

2. The method of claim 1, wherein the centerline of the second agricultural machine passes is a center portion of a pick-up mechanism of the second agricultural machine.

3. The method of claim 1, further including determining whether each second engagement body of the second plurality of engagement bodies is arranged to travel along the first plurality of track paths.

4. The method of claim 3, further comprising identifying, in response to determining each second engagement body of the second plurality of engagement bodies is not arranged to travel along the first plurality of track paths, at least one track path of the first plurality of track paths that is to be followed by one or more second engagement bodies of the second plurality of engagement bodies.

5. The method of claim 1, further including receiving information regarding one or more properties of a crop material that was obtained during an operation of the first agricultural machine.

6. The method of claim 5, wherein the one or more properties is a moisture content of the crop material, and wherein the agricultural operation adjusts a density of a crop bale formed during the agricultural operation based on the moisture content of the crop material.

7. The method of claim 5, wherein the one or more properties is a moisture content of the crop material, and wherein the agricultural operation adjusts a dosing rate by a dosing system of the second agricultural machine based on the moisture content of the crop material.

8. The method of claim 1, wherein the adjusting of the diverter further comprises controlling an operation of a diverter of the first agricultural machine to deposit the second windrow such that the centerline of the second windrow is offset from the centerline of the first agricultural machine.

9. The method of claim 8, wherein controlling the operation of the diverter comprises oscillating one or more steering vanes of the diverter to form the second windrow with a non-linear shape.

10. The method of claim 1, wherein the second windrow has a serpentine or wave shape.

11. The method of claim 1, further comprising recording a second plurality of track paths, the second plurality of track paths corresponding to locations at which the second plurality of engagement bodies engaged the ground surface as the second plurality of engagement bodies travel across the field.

12. The method of claim 1, further comprising:
identifying one or more locations in the field having a lower field moisture attribute than other portions of the field; and
determining a travel plan for guiding the second agricultural machine, the travel plan being based at least in part on having the second agricultural machine travel along portions of the first plurality of track paths that are positioned at least along some of the identified one or more locations before the second agricultural machine is to travel to the other portions of the field.

13. A method comprising:
receiving information regarding a configuration of a second agricultural machine that will perform an agricultural operation using a windrow deposited on a field by a first agricultural machine, the received information indicating at least a position of a plurality of engagement bodies of the second agricultural machine;
selecting at least one engagement body of the plurality of engagement bodies of the second agricultural machine to travel along a track path of a plurality of track paths, each track path of the plurality of track paths corresponding to a location at which at least one of a first plurality of engagement bodies of a first agricultural machine engage a ground surface of the field;
determining a travel path for the second agricultural machine along which the selected at least one engagement body is to travel along the track path;
determining, based on the travel path, a location of a centerline of at least a portion of the second agricultural machine along the travel path; and
adjusting, in response to determining the location of at least the portion of the centerline of the second agricultural machine, a diverter of the first agricultural machine to deposit the windrow on the field at a location at which a centerline of the windrow is aligned with the centerline of at least the portion of the second agricultural machine,
wherein adjusting the diverter occurs subsequent to determining a location of a windrow centerline of another windrow deposited on the field by the first agricultural machine is offset from the centerline of the second agricultural machine.

14. The method of claim 13, wherein the selecting of the at least one engagement body further comprises selecting the at least one engagement body of the plurality of engagement bodies that exerts the largest downward force or load on the ground surface of the field.

15. The method of claim 13, wherein the selecting of the at least one engagement body further comprises selecting a combination of the plurality of engagement bodies of the second agricultural machine that results in the largest number of engagement bodies of the plurality of engagement bodies of the second agricultural machine either being aligned with or partially overlapping the plurality of track paths.

16. The method of claim 13, further comprising receiving information indicating a location of the plurality of track paths, and
wherein the received information includes at least one of the following: a position of an intake assembly of the second agricultural machine, a location of a centerline of the intake assembly, and/or a width of the intake assembly.

17. The method of claim 13, wherein the first agricultural machine is a windrower, and the second agricultural machine is a baler, and wherein adjusting the diverted further comprises adjusting the diverter of the first agricultural machine to deposit the windrow on the field at a location at which the a centerline of the windrow is offset relative to at least a centerline of the first agricultural machine and aligned with a center portion of an intake assembly of the second agricultural machine.

18. The method of claim 17, wherein adjusting the diverter includes oscillating the diverter to provide the windrow with a non-linear shape.

19. The method of claim 13, further comprising:
identifying one or more characteristics for a plurality of areas of the field, the one or more characteristics including at least one of a soil composition, a soil moisture content, and a crop moisture content; and
identifying an order in which the first agricultural machine is to travel within the plurality of areas of the field while depositing the windrow, the order being based at least in part on the identified one or more characteristics.

* * * * *